US012197160B2

(12) United States Patent
Takayama et al.

(10) Patent No.: US 12,197,160 B2
(45) Date of Patent: Jan. 14, 2025

(54) IMAGE FORMING APPARATUS

(71) Applicant: CANON KABUSHIKI KAISHA, Tokyo (JP)

(72) Inventors: Toshihiko Takayama, Kanagawa (JP); Shuichi Tetsuno, Kanagawa (JP); Shinsuke Kobayashi, Kanagawa (JP); Hiroko Katagiri, Tokyo (JP); Mikihiko Hamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/473,571

(22) Filed: Sep. 25, 2023

(65) Prior Publication Data

US 2024/0111240 A1 Apr. 4, 2024

(30) Foreign Application Priority Data

Sep. 28, 2022 (JP) ................................ 2022-154910
Feb. 13, 2023 (JP) ................................ 2023-019681

(51) Int. Cl.
*G03G 15/00* (2006.01)
*G03G 15/02* (2006.01)

(52) U.S. Cl.
CPC ....... *G03G 15/757* (2013.01); *G03G 15/0216* (2013.01)

(58) Field of Classification Search
CPC ....................... G03G 15/0216; G03G 15/7587
USPC ......................................................... 399/167
See application file for complete search history.

(56) References Cited

FOREIGN PATENT DOCUMENTS

| | | | |
|---|---|---|---|
| JP | 2009063936 | A | 3/2009 |
| JP | 2010210858 | A | 9/2010 |
| JP | 2014219485 | * | 11/2014 |
| JP | 2016110052 | A | 6/2016 |
| JP | 2016167054 | A | 9/2016 |
| JP | 2021105738 | A | 7/2021 |

* cited by examiner

*Primary Examiner* — Hoan H Tran
(74) *Attorney, Agent, or Firm* — Canon U.S.A., Inc. IP Division

(57) ABSTRACT

An image forming apparatus includes a photosensitive drum, a charging member, a developing member, a transfer member, first and second gears, a drive source, and a control unit. The charging member contacts the photosensitive drum and forms a charging portion to charge a surface of the photosensitive drum. The control unit performs control in such a manner that an image forming operation of performing image formation by rotating the photosensitive drum at a first rotational speed is executable. Where the control unit executes the image forming operation, the control unit performs a switch operation of stopping the photosensitive drum in a state in which the photosensitive drum is driven, while a non-image forming operation to be executed after the image forming operation is executed, and rotationally driving the photosensitive drum again at a second rotational speed faster than the first rotational speed, a plurality of times.

15 Claims, 12 Drawing Sheets

IMAGE FORMING APPARATUS

BACKGROUND

Field

The present disclosure relates to an image forming apparatus that uses an electrophotographic recording method, such as a laser printer, a copier, or a facsimile device.

Description of the Related Art

In a conventional electrophotographic image forming apparatus, by performing exposure in accordance with an image pattern after using rotation of a charging roller to uniformly charge a photosensitive drum serving as an image bearing member, an electrostatic latent image is formed on the photosensitive drum. After that, the electrostatic latent image on the photosensitive drum is visualized by being developed with toner, and is transferred onto a recording material such as paper. As a unit that collects untransferred residual toner remaining on the photosensitive drum, there has been known a cleaner-less method (simultaneous developing/cleaning method) that reuses untransferred residual toner collected into a development device in a development unit.

Japanese Patent Application Laid-Open No. 2016-110052 discusses a configuration of making a speed difference (hereinafter, circumferential speed difference) in surface speed between a photosensitive drum and a charging roller in a case where the charging roller is used as a charging unit of the photosensitive drum, to prevent a charging failure that occurs due to excessive toner adhesion to the charging roller. As an inexpensive unit that makes a circumferential speed difference between the photosensitive drum and the charging roller, there is a configuration of connecting a photosensitive drum and a charging roller from a single drive source by a gear train.

Regarding the above-noted conventional electrophotographic image forming apparatus, it is possible that a foreign substance, generated on an inside or an outside of an apparatus during an image forming operation, is transferred onto the photosensitive drum via a recording material. The foreign substance that has been transferred onto the photosensitive drum is then transferred onto the charging roller, and accompanies the rotation of the charging roller on a surface of the charging roller. In this case, the foreign substance has sometimes damaged a surface of the photosensitive drum at a circumferential length pitch of the charging roller. Especially in a configuration in which the photosensitive drum and the charging roller are connected by a gear train, because a specific position in a circumferential direction on the photosensitive drum surface is repeatedly damaged, an image defect has prominently occurred in some cases.

SUMMARY

The present disclosure is directed to preventing an adverse effect on an image from being caused by a foreign substance adhering to a charging roller.

Preventing an adverse effect on an image is achieved by an electrophotographic image forming apparatus according to the present disclosure.

According to an aspect of the present disclosure, an image forming apparatus includes a photosensitive drum that is rotatable, a charging member configured to form a charging portion by having contact with the photosensitive drum, and to charge a surface of the photosensitive drum at the charging portion, a developing member configured to supply toner to form on the surface of the photosensitive drum charged by the charging member, a transfer member configured to form a transfer portion by having contact with the photosensitive drum, and transfer the toner formed on the photosensitive drum, onto a member to be transferred at the transfer portion, a first gear configured to rotate the photosensitive drum, a second gear configured to rotate the charging member and to engage with the first gear, a drive source configured to rotationally drive the photosensitive drum and the charging member by transmitting drive to the first gear, and a control unit configured to control the drive source, wherein the control unit performs control in such a manner that an image forming operation of performing image formation by rotating the photosensitive drum at a first rotational speed is executable, and wherein, in a case where the control unit executes the image forming operation, the control unit performs control in such a manner as to perform a switch operation of stopping the photosensitive drum in a state in which the photosensitive drum is driven, while a non-image forming operation to be executed after the image forming operation is executed, and rotationally driving the photosensitive drum again at a second rotational speed faster than the first rotational speed, a plurality of times.

Further features of the present disclosure will become apparent from the following description of exemplary embodiments with reference to the attached drawings.

DESCRIPTION OF THE EMBODIMENTS

Hereinafter, a mode for carrying out the disclosure will be exemplarily described in detail with reference to the drawings based on an exemplary embodiment. Nevertheless, the dimensions, materials, shapes, and relative arrangement of components to be described in the exemplary embodiment are to be appropriately changed depending on the configuration and various conditions of an apparatus to which the disclosure is applied. In other words, the exemplary embodiment is not intended to limit the scope of the disclosure to the following exemplary embodiment.

1. Image Forming Apparatus

Figure 1:
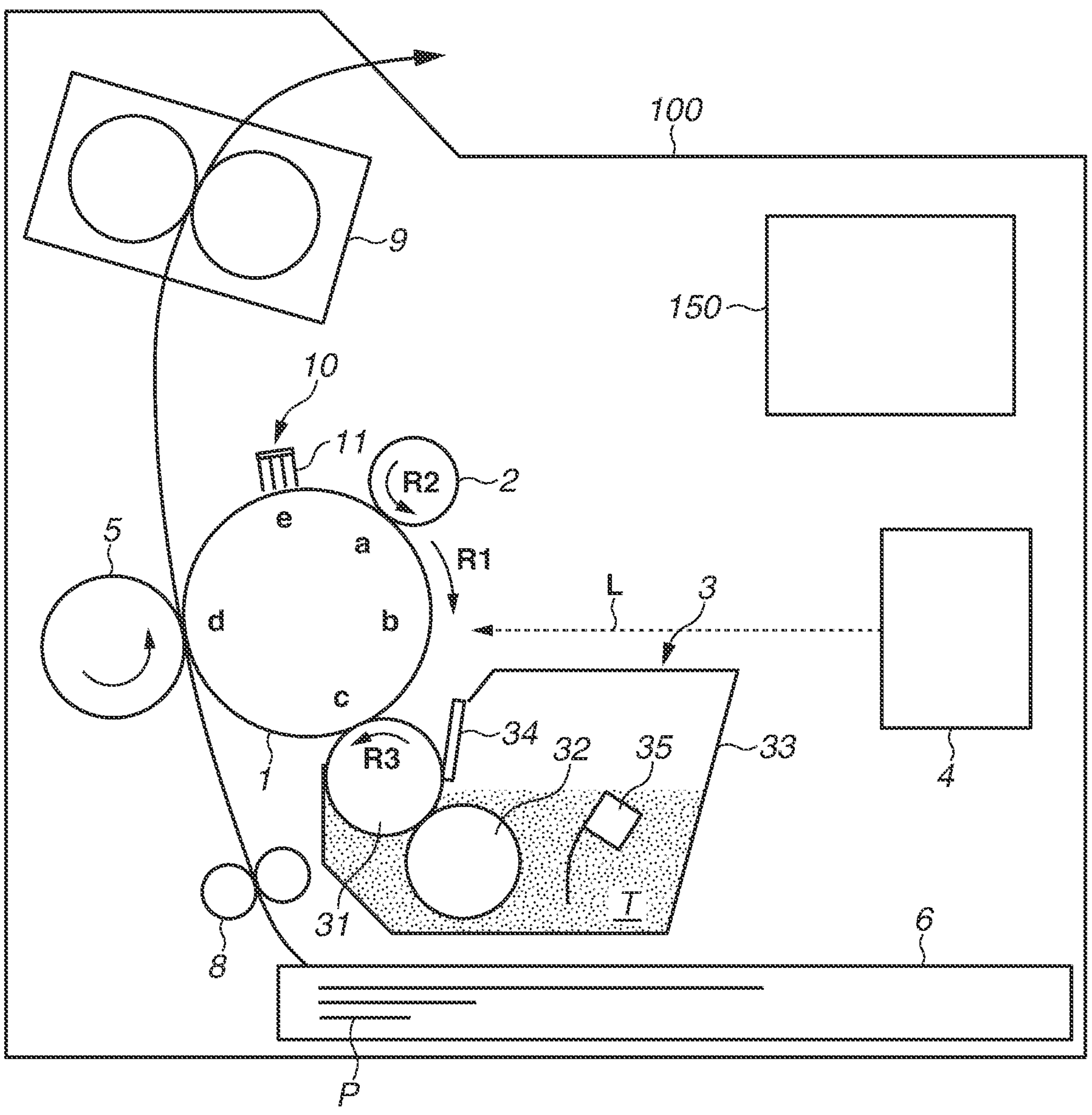
FIG. 1 is a schematic cross-sectional view of the image forming apparatus according to a first exemplary embodiment.

FIG. 1 is a schematic configuration diagram of an image forming apparatus 100 according to the first exemplary embodiment of the present disclosure.

The image forming apparatus 100 of the present exemplary embodiment is a monochrome laser beam printer that uses a cleaner-less method and a contact charging method. The image forming apparatus 100 includes a photosensitive drum 1 being a drum-shaped (cylindrical) electrophotographic photosensitive member serving as a rotatable image bearing member. If an image output operation is started, the photosensitive drum 1 is rotationally driven by a drive motor 110 (FIG. 2) in an arrow R1 direction in FIG. 1.

In the vicinity of a charge nip portion a at which the photosensitive drum 1 and a charging roller 2 have contact, the surface of the rotating photosensitive drum 1 is uniformly charged to a predetermined potential of regular polarity (negative polarity in the present exemplary embodiment) by the charging roller 2 being a roller-type charging member serving as a charging unit. More specifically, the charging roller 2 charges the surface of the photosensitive drum 1 by electric discharge that occurs in at least one of small air gaps between the photosensitive drum 1 and the charging roller 2 that are formed on the upstream side and the downstream side of a contact portion with the photosensitive drum 1 in a rotational direction of the photosensitive drum 1. The description will be given on the assumption that a contact portion between the charging roller 2 and the photosensitive drum 1 in the rotational direction of the photosensitive drum 1 is regarded as a charging portion.

The charging roller 2 is an elastic roller in which a conductive elastic layer is provided around a metal core, is arranged in contact with the photosensitive drum 1, and rotationally driven in an arrow R2 direction in FIG. 1. As described below, in the present exemplary embodiment, the charging roller 2 is driven to rotate. A predetermined charging voltage being a negative polarity direct-current voltage is applied to the charging roller 2 from a charge power source E1 (FIG. 2) serving as a charging voltage application unit. In the present exemplary embodiment, at the time of charging processing, a negative polarity direct-current voltage is applied to the charging roller 2 as a charging voltage. An example, the charging voltage in the present exemplary embodiment is set to −1200 V. In the present exemplary embodiment, the surface of the photosensitive drum 1 is accordingly uniformly charged to a dark area potential Vd of −600 V.

The charged surface of the photosensitive drum 1 is subjected to scanning exposure executed by an exposure unit (laser exposure unit) 4 serving as an exposure unit (electrostatic image formation unit), using laser beam L modulated in accordance with image data. By performing exposure also in a sub scanning direction (surface moving direction) while repeating exposure in a main scanning direction (rotational axis direction) of the photosensitive drum 1 using the laser beam L, the exposure unit 4 forms an electrostatic latent image onto the photosensitive drum 1. In the present exemplary embodiment, the dark area potential Vd of the surface of the photosensitive drum 1 that has been formed by uniform charging processing decreases in an absolute value by the surface being exposed by the exposure unit 4, and becomes a light area potential Vl of −100 V. In the rotational direction of the photosensitive drum 1, a position on the photosensitive drum 1 that is exposed by the exposure unit 4 is an image exposed portion b. The exposure unit 4 is not limited to a laser scanner device. For example, a light-emitting diode (LED) array in which a plurality of LEDs is arrayed in a longer direction of the photosensitive drum 1 may be employed.

The electrostatic latent image formed on the photosensitive drum 1 is developed (visualized) as a toner image using toner T serving as a developer, by a development device 3 serving as a development unit. As toner serving as a developer in the present exemplary embodiment, spherical nonmagnetic toner with an average particle diameter of 6.4 μm and an average circularity degree of 0.98 is used. The average circularity degree of nonmagnetic toner used in the present exemplary embodiment is desirably high. Specifically, the average circularity degree is desirably 0.96 or more. The average circularity degree in the present exemplary embodiment is used as a simple method of quantitatively representing the shape of particles. A circularity degree is obtained using the following equation 1 by measuring the particle shape using a flow particle image analyzer FPIA-2100 manufactured by the Toa Medical Electronics Co., Ltd.

Circularity degree (*Ci*)=Circumferential length of circle having the same projection area as the number of particles/Circumferential length of particle projected image (1)

Furthermore, as represented by the following formula 2, a value obtained by dividing the sum of circularity degrees of all the measured particles by the total number of particles is defined as an average circularity degree.

$$\text{Average circularity degree } \overline{(C)} = \sum_{i=m}^{m} Ci/m \quad (2)$$

The development device 3 includes a development roller 31 serving as a developer bearing member and a developing member, a toner supply roller 32 serving as a developer supply unit, a developer accommodating chamber 33 accommodating toner, and a development blade 34. Toner accommodated in the developer accommodating chamber 33 is agitated by an agitation member 35, and supplied to the surface of the development roller 31 by the toner supply roller 32. The toner supplied to the surface of the development roller 31 is evenly formed into a thin layer by passing through a contact portion between the development roller 31 and the development blade 34, and is charged to negative polarity by abrasion charging. In the present exemplary embodiment, a nonmagnetic one-component contact development method is employed, but the development method is not limited to this. A nonmagnetic two-component contact development method or a noncontact development method may be employed. Alternatively, a magnetic development method may be employed. In addition, in the present exemplary embodiment, the regular polarity of toner is assumed to be negative polarity, but the regular polarity is not limited to the negative polarity. The regular polarity may be positive polarity. In this case, it is sufficient that a voltage relationship to be described below is appropriately reversed in polarity. The development roller 31 is rotationally driven counterclockwise in an arrow R3 direction in FIG. 3 in such a manner that moving directions of the surface of the photosensitive drum 1 and the surface of the development roller 31 become the same direction at a development portion c at which the photosensitive drum 1 and the development roller 31 have contact. A drive motor serving as a drive unit that drives the development roller 31 may be the same main motor as the drive motor 110 of the photosensitive drum 1, or different drive motors may respectively rotate the photosensitive drum 1 and the development roller 31. At the time of development, a predetermined development voltage (development bias) is applied to the development roller 31 by a development power source E2 (FIG. 2) serving as a development voltage application unit. In the present exemplary embodiment, a negative polarity direct-current voltage is applied to the development roller 31 as a development voltage, and a development voltage applied at the time of development is set to −300 V. In the present exemplary embodiment, by exposure being performed after uniform charging processing, toner charged to the negative polarity being the same polarity as charge polarity of the photosensitive drum 1 adheres to an exposure surface being an image formation portion on the photosensitive drum 1 on which the absolute value of the potential declines. This development method is referred to as a reversal development method.

In the present exemplary embodiment, the development roller 31 has a configuration of always being in contact with the photosensitive drum 1 at the development portion c. Alternatively, a configuration in which the development roller 31 and the photosensitive drum 1 can enter a contact state and a separated state may be employed. In this case, a development contact and separation mechanism may be additionally provided. During a rotation operation being a pre-rotation process to be described below, the photosensitive drum 1 may be rotated in a state in which the development roller 31 is separated from the photosensitive drum 1.

Figure 2:
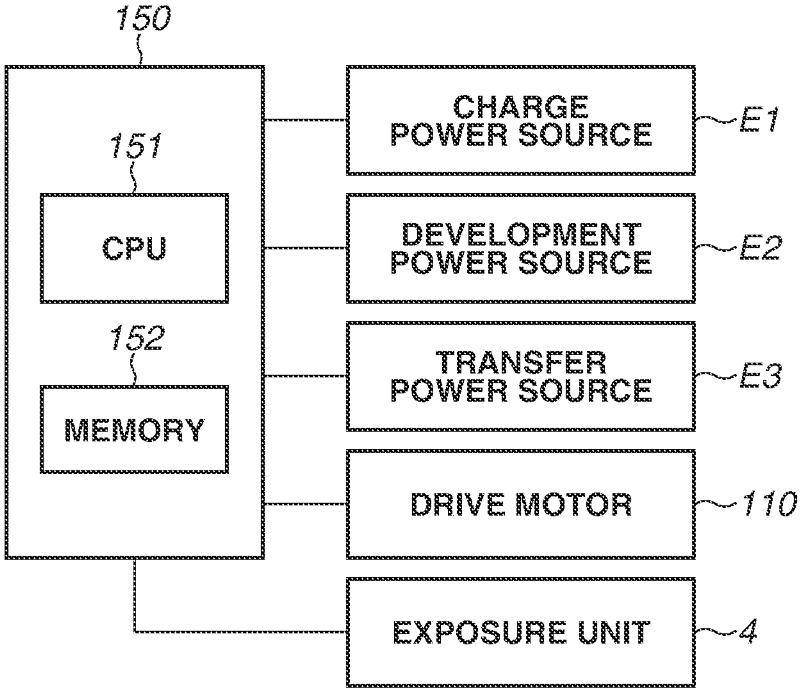
FIG. 2 is a control block diagram according to the first exemplary embodiment.

A toner image formed on the photosensitive drum 1 is sent to a transfer portion d being a contact portion between the photosensitive drum 1 and a transfer roller 5 being a roller-type transfer member serving as a transfer unit. As the transfer roller 5 in the present exemplary embodiment, a roller with an outer diameter of 12 mm and a hardness of 30° (Asker-C, 500 gf load) that is formed of conductive nitrile butadiene rubber (NBR) or hydrin sponge rubber is employed, and the transfer roller 5 is pressed against the photosensitive drum 1 with a predetermined pressure. On the other hand, at a timing synchronized with the conveyance timing of the toner image on the photosensitive drum 1, a recording material P being a member to be transferred is conveyed to a transfer portion d from an accommodating portion 6 by a conveyance roller 8. Then, at the transfer portion d, the toner image on the photosensitive drum 1 is transferred onto the recording material P conveyed with being nipped between the photosensitive drum 1 and the transfer roller 5, by the function of the transfer roller 5. At this time, a predetermined transfer voltage being a direct-current voltage with reverse polarity (positive polarity in the present exemplary embodiment) from the regular polarity of toner is applied to the transfer roller 5 from a transfer power source E3 (FIG. 2). An electric field is accordingly formed between the transfer roller 5 and the photosensitive drum 1, and the toner image is electrostatically transferred from the photosensitive drum 1 onto the recording material P. In the present exemplary embodiment, a transfer voltage to be applied at the time of the transfer is set to +1000 V, as an example. Then, by the function of the electric field formed between the transfer roller 5 and the photosensitive drum 1, the toner image is electrostatically transferred from the photosensitive drum 1 onto the recording material P.

The recording material P bearing the transferred toner image is set to a fixing device 9 serving as a fixing unit. In the fixing device 9, heat and pressure are added to the recording material P, and the toner image is fixed onto the recording material P.

On the other hand, untransferred residual toner remaining on the photosensitive drum 1 without being transferred onto the recording material P is charged again to negative polarity by electric discharge at the charge nip portion a. The untransferred residual toner charged to the negative polarity reaches the development portion c in accordance with the rotation of the photosensitive drum 1, and is collected into the development device 3.

2. Photosensitive Drum and Charging Roller

The photosensitive drum 1 serving as an image bearing member is a photosensitive member formed into a cylindrical shape. the photosensitive drum 1 of the present exemplary embodiment includes a photosensitive layer formed by a negatively-charged organic photosensitive member on a drum-shaped base member formed of aluminum. More specifically, the photosensitive drum 1 is a rigid member formed by sequentially coating an outer circumference of an aluminum cylinder with a diameter of 24 mm with a resistive layer, an undercoating layer, and a photosensitive layer using a dipping coating method, and the photosensitive layer includes a charge generation layer and a charge transport layer. A film thickness of the charge transport layer is 22 μm. In addition, the photosensitive drum 1 is rotationally driven by the drive motor 110 around a rotational axis in the arrow R1 direction at a predetermined circumferential speed. Because the circumferential speed of the photosensitive drum 1 defines the speed of image formation executed by the image forming apparatus 100, the circumferential speed is also referred to as a process speed. The process speed in the present exemplary embodiment includes a process speed adapted to a first mode, and a process speed adapted to a second mode in which the process speed is higher than that in the first mode. The circumferential speed of the photosensitive drum 1 that is adapted to the process speed in the first mode is 93 mm/sec, and the circumferential speed of the photosensitive drum 1 that is adapted to the process speed in the second mode is 140 mm/sec. In the present exemplary embodiment, the second mode is normally used, and the first mode is used as a low-speed mode. The low-speed mode refers to a mode in which the recording material P with a thick thickness such as gloss paper or thick paper is passed, and includes a gloss mode and a thick paper mode, in which fixing is performed at an increased fixing temperature.

The charging roller 2 serving as a charging member contacts the photosensitive drum 1 with predetermined pressure contact force, and forms the charge nip portion a. In the present exemplary embodiment, a contact nip width in the rotational direction between the charging roller 2 and the photosensitive drum 1 is about 1 mm. By the charge power source E1 serving as a charging voltage application circuit applying a charging voltage being a direct-current voltage, the surface of the photosensitive drum 1 is uniformly charged to a predetermined potential. The charging roller 2 includes a metal core with a diameter of 5 mm, a base layer made of hydrin rubber, and an urethan surface layer, and formed in such a manner as to have an outer diameter of 9.7 mm. In addition, a resistance of the charging roller 2 is $1\times10^{6}\Omega$ or less, and a hardness measured by the MD-1 rubber hardness meter is 70 degrees. The direct-current voltage is used as the charging voltage in the present exemplary embodiment, but the charging voltage is not limited to this. The charging voltage in the present exemplary embodiment may be a voltage obtained by superimposing an alternating-current voltage onto a direct-current voltage.

3. Drive Configuration of Charging Roller

Figure 3:
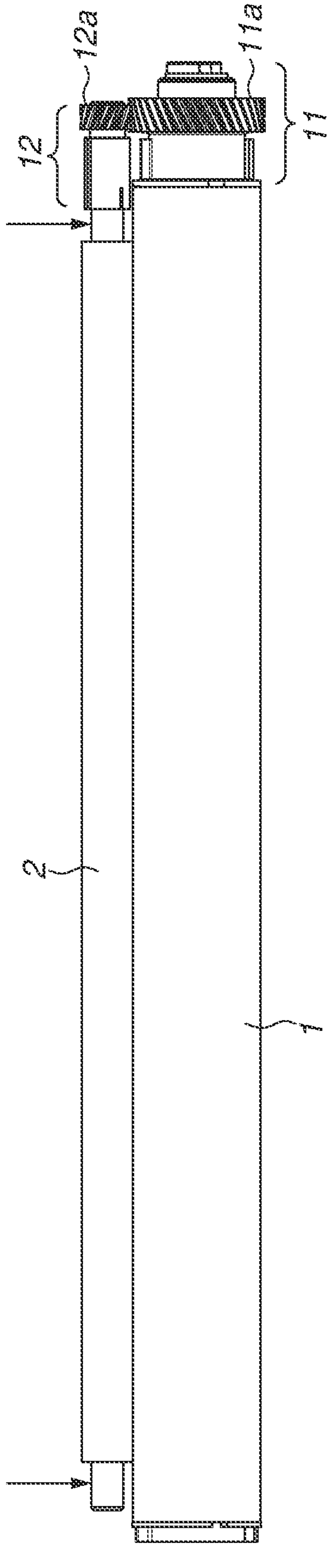
FIG. 3 is an explanatory diagram of a drive system of a photosensitive drum and a charging roller according to the first exemplary embodiment.

Next, a rotary drive configuration of the charging roller 2 in the present exemplary embodiment will be described in detail with reference to FIGS. 3 and 4. FIG. 3 is a diagram illustrating the arrangement in the longer direction of the photosensitive drum 1, the charging roller 2, and gears (gear flanges) 11 and 12 that transmit drive. In the present exemplary embodiment, as illustrated in FIG. 3, the gear flange 11 is fixedly attached to an end of the photosensitive drum 1 in the longer direction of the photosensitive drum 1. In the longer direction, a side on which the gears 11 and 12 are arranged is regarded as a drive side, and another end side is regarded as a non-drive side. The drive from the drive motor 110 is transmitted to the end of the gear flange 11, and the photosensitive drum 1 is rotationally driven. As illustrated in FIG. 3, a gear shape portion 11*a* is formed in the gear flange 11, and is engaged with a gear portion 12*a* of the charging roller gear 12 pushed in at the end of the metal core of the charging roller 2.

Figure 4:
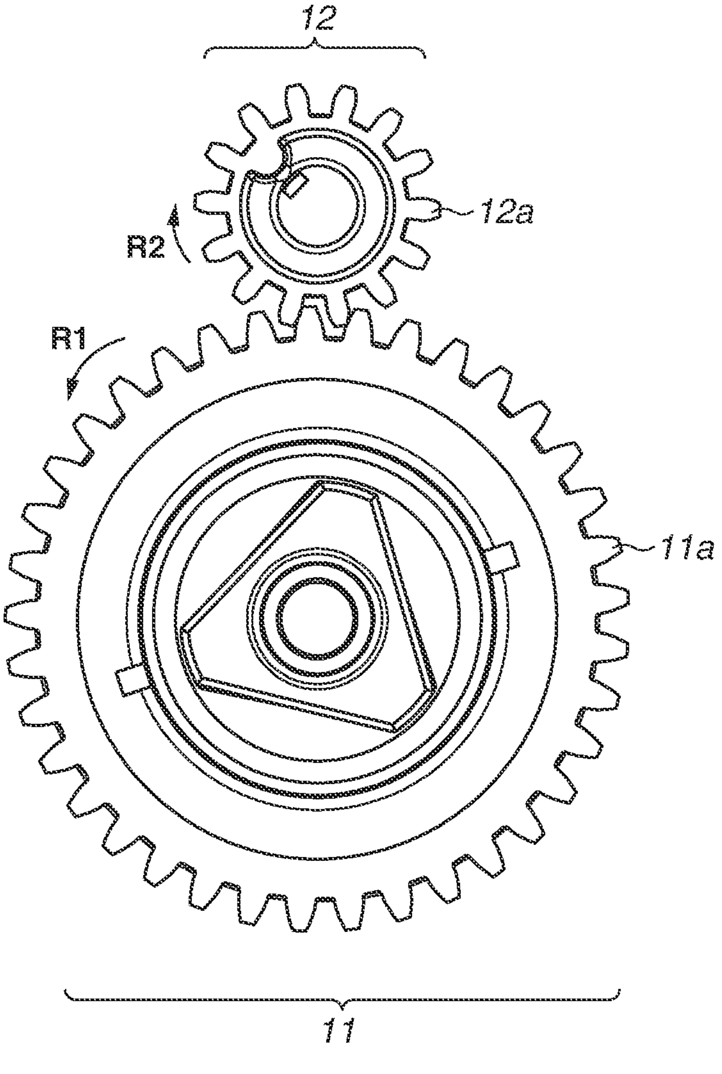
FIG. 4 is an explanatory diagram of a drive train of a photosensitive drum and a charging roller according to the first exemplary embodiment.

In the present exemplary embodiment, as illustrated in FIG. 4, the number of teeth of the gear shape portion 11*a* of the gear flange 11 of the photosensitive drum 1 is 37, and the number of teeth of the gear 12 of the charging roller 2 is 14. Based on the above-described combination of the numbers of teeth, and outer diameters of the charging roller 2 and the photosensitive drum 1, in the present exemplary embodiment, a speed ratio between the surface speed of the charging roller 2 and the surface speed of the photosensitive drum 1 (surface speed of the charging roller 2/surface speed of the photosensitive drum 1, hereinafter, referred to as a circumferential speed ratio) that is obtainable at the time of rotary drive becomes about 107%. By generating a speed difference between the charging roller 2 and the photosensitive drum 1 (the charge nip portion a), it becomes easier to return toner adhering to the charging roller 2, to the photosensitive drum 1 by abrasion charging. Here, the surface speed of the charging roller 2 and the surface speed of the photosensitive drum 1 respectively refer to a surface moving speed of the charging roller 2 and a surface moving speed of the photosensitive drum 1.

The respective surface speeds of the charging roller 2 and the photosensitive drum 1 can be rephrased as a rotational speed of the charging roller 2 and a rotational speed the photosensitive drum 1.

In the present exemplary embodiment, pressurizing springs (not illustrated) that press against the surface of the photosensitive drum 1 in a vertical direction are provided at metal core portions at both end positions of the charging roller 2 indicated by arrows in FIG. 3, via bearings (not illustrated). The pressing force on the charging roller gear 12 side (i.e., drive side) is 7.5 N, and the pressing force on the opposite side of the charging roller gear 12 (i.e., non-drive side) is 5.6 N.

4. Image Output Operation

In accordance with one start instruction from an external device (not illustrated) such as a personal computer in the present exemplary embodiment, the image forming apparatus 100 executes an image output operation (job) including a series of operations of forming images onto one or a plurality of recording materials P. The job generally includes an image formation process (printing process), a pre-rotation process, a sheet interval process in the case of forming images onto a plurality of recording materials P, and a post-rotation process. The image formation process is a process to be performed during a period during which the formation of an electrostatic image onto the photosensitive drum 1, the development of the electrostatic image (the formation of the toner image), the transfer of the toner image, and the fixing of the toner image are actually performed, and an image formation period refers to this period. More specifically, the timing of the image formation period varies depending on positions at which the formation of the electrostatic image, the formation of the toner image, the transfer of the toner image, and the fixing of the toner image are performed. Accordingly, operations up to the transfer of the toner image may be defines as the image forming operation, or operations up to the fixing of the toner image may be defines as the image forming operation. Even if the image forming operation performed on the photosensitive drum 1 ends, and the operation of the photosensitive drum 1 is switched from the image forming operation to a non-image forming operation, no influence is exerted on images already transferred onto the recording material P. Thus, the above-described definition may be used in some cases. The pre-rotation process is a process to be performed during a period during which a preparation operation before the image formation process is performed. The sheet interval process is a process corresponding to an interval between the recording material P and the recording material P when the image formation process is continuously performed onto a plurality of recording materials P (continuous image formation period). The post-rotation process is a process to be performed during a period during which an organizing operation (preparation operation) after the image formation process is performed. The non-image formation period is a period other than the image formation period, and includes the pre-rotation process, the sheet interval process, and the post-rotation process, which have been described above. Furthermore, the non-image formation period includes a multiple pre-rotation process being a preparation operation to be performed when the power of the image forming apparatus 100 is turned on, or when the image forming apparatus 100 recovers from a sleep state.

5. Control Configuration

FIG. 2 is a schematic block diagram illustrating a control configuration of a main portion of the image forming apparatus 100 according to the present exemplary embodiment. The image forming apparatus 100 is provided with a control unit 150. The control unit 150 includes a central processing unit (CPU) 151 serving as a calculation control unit being a central element that performs calculation processing, a nonvolatile memory 152 serving as a storage unit, and an input-output unit (not illustrated) that controls the transmission and reception of signals to be performed with various components connected to the control unit 150. The nonvolatile memory 152 is used to temporarily hold control data, or used as a working area for calculation processing accompanying the control. In the present exemplary embodiment, the nonvolatile memory 152 can store information regarding the number of sheets continuously passed when a plurality of recording materials is continuously passed, and information regarding the total number of passed sheets of the image forming apparatus.

The control unit 150 is a control unit that comprehensively controls the operations of the image forming apparatus 100. The control unit 150 executes a predetermined image formation sequence by controlling timings of transmission and reception of various electric information signals and the drive. The components of the image forming apparatus 100 are connected to the control unit 150. For example, in relation to the present exemplary embodiment, the charge power source E1, the development power source E2, the transfer power source E3, the drive motor 110, and an exposure unit 4 are connected to the control unit 150.

6. Foreign Substance Cleaning Control of Charging Roller

To facilitate the understanding of the control of the present exemplary embodiment, example circumstances regarding the present exemplary embodiment will be described in detail below.

In an example, a foreign substance existing on the inside or the outside of the image forming apparatus 100 is conveyed to the transfer portion d via the recording material P, and the foreign substance is transferred onto the photosensitive drum 1 at the transfer portion d. After that, in a case where the foreign substance is transferred onto the charging roller 2 at the charge nip portion a, and the foreign substance continues to stay on the charging roller 2, the foreign substance damages the surface of the photosensitive drum 1, which causes an issue. If the surface of the photosensitive drum 1 is damaged, black spot images are generated at a specific pitch. Examples of the foreign substance include a metal piece, a resin piece, and minerals such as quartz. Such a relatively hard foreign substance easily damages the photosensitive drum 1, and is likely to lead to black spot images. A reason the black spot images are generated at a specific pitch is given below.

Figure 5:
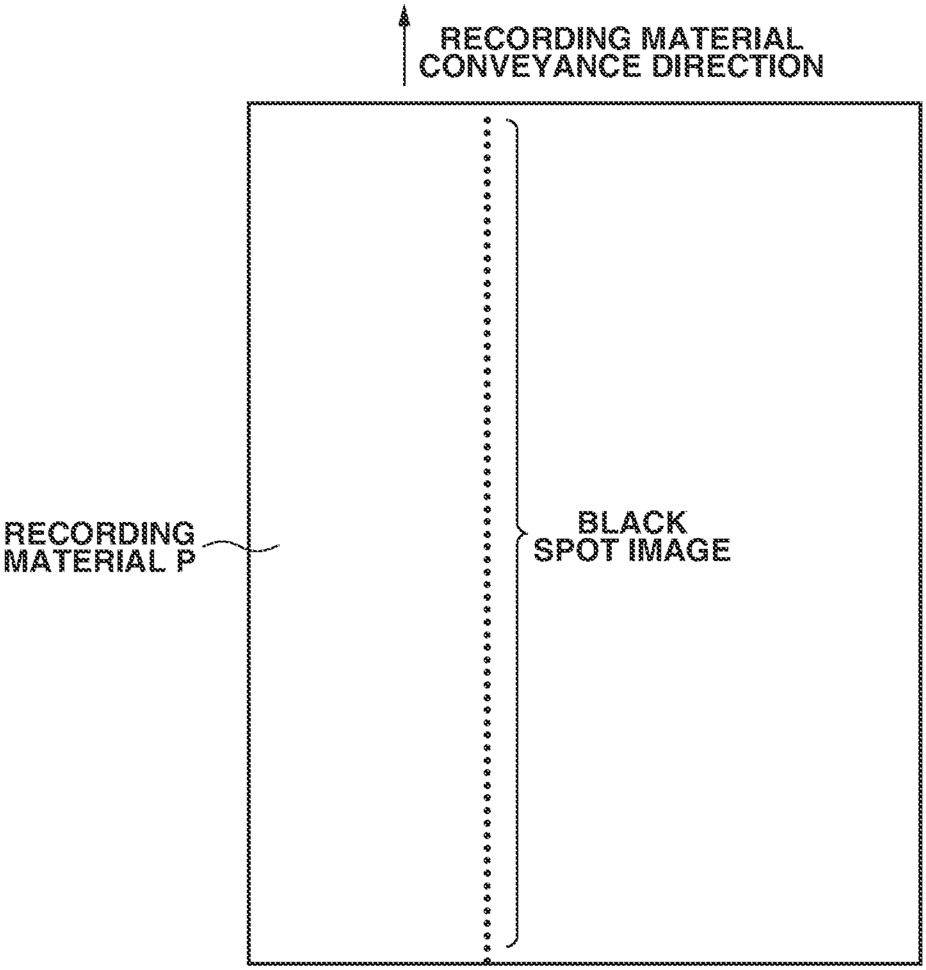
FIG. 5 is a diagram illustrating an adverse effect on an image according to the first exemplary embodiment.

In the present exemplary embodiment, as described above, the charging roller 2 is rotationally driven via the gear 12 at a fixed circumferential speed ratio. After a foreign substance initially adheres to the charging roller 2, the foreign substance damages the photosensitive drum 1 at the cycle of the charging roller 2. Because the charging roller gear 12 has 14 teeth as described above, the foreign substance damages the surface of the photosensitive drum 1 at a pitch corresponding to 14 teeth of the gear flange 11 of the photosensitive drum 1 (=$\varphi 24 \times \pi \times 14$ teeth/37 teeth). Here, the number of gears of the gear flange 11 of the photosensitive drum 1 is 37. Thus, if the charging roller gear 12 is rotationally driven by a length corresponding to 518 teeth (=$14 \times 37$) being the least common multiple of the numbers of teeth of the charging roller gear 12 and the gear flange 11 of the photosensitive drum 1, the charging roller gear 12 returns to the same position. During the period, the foreign substance on the charging roller 2 damages the surface of the photosensitive drum 1 once every pitch of about 2 mm (=$\varphi 24 \times \pi/37$ teeth). If the foreign substance continues to stay at the same position on the charging roller 2, the foreign substance further damages the same position on the surface of the photosensitive drum 1 repeatedly, and the charge transport layer of the surface of the photosensitive drum 1 gradually becomes thinner and a recess portion is formed. Accordingly, it becomes unable to hold charged electric charges in the recess portion. If it consequently becomes unable to hold electric charges in the charge transport layer, a developer is developed onto the photosensitive drum 1 at the development portion c, and black spot images as illustrated in FIG. 5 are generated. Especially under a high-temperature and humidity environment, electric charges around a recess portion easily flow to a recess portion with low resistance, and the visibility of black spots tends to become higher.

As described above, the foreign substance that continues to stay on the charging roller 2 generates black spot images. Thus, if a foreign substance transferred onto the charging roller 2 can be quickly removed, the generation of black spot image can be prevented.

In the configuration of the present exemplary embodiment, as the size of a foreign substance becomes larger, adhesion force becomes smaller and the foreign substance is easily removed relatively quickly even if the foreign substance temporality adheres to the charging roller 2. On the other hand, as the size of a foreign substance becomes smaller, adhesion force becomes larger, and it becomes more difficult to remove the foreign substance, but the influence of the foreign substance is likely to be absorbed because the foreign substance is buried in the surface roughness or elastic deformation of the charging roller 2. Thus, a small foreign substance has been unlikely to damage the photosensitive drum 1 and unlikely to lead to an image defect. In the case of the present exemplary embodiment, from the above-described tendency of size and adhesion of the foreign substance, a foreign substance with a size of about 50 to 300 μm is especially likely to stay on the charging roller 2. Furthermore, if the foreign substance is hard, the foreign substance damages the photosensitive drum 1 more easily, and tends to lead to an image defect.

Figure 6:
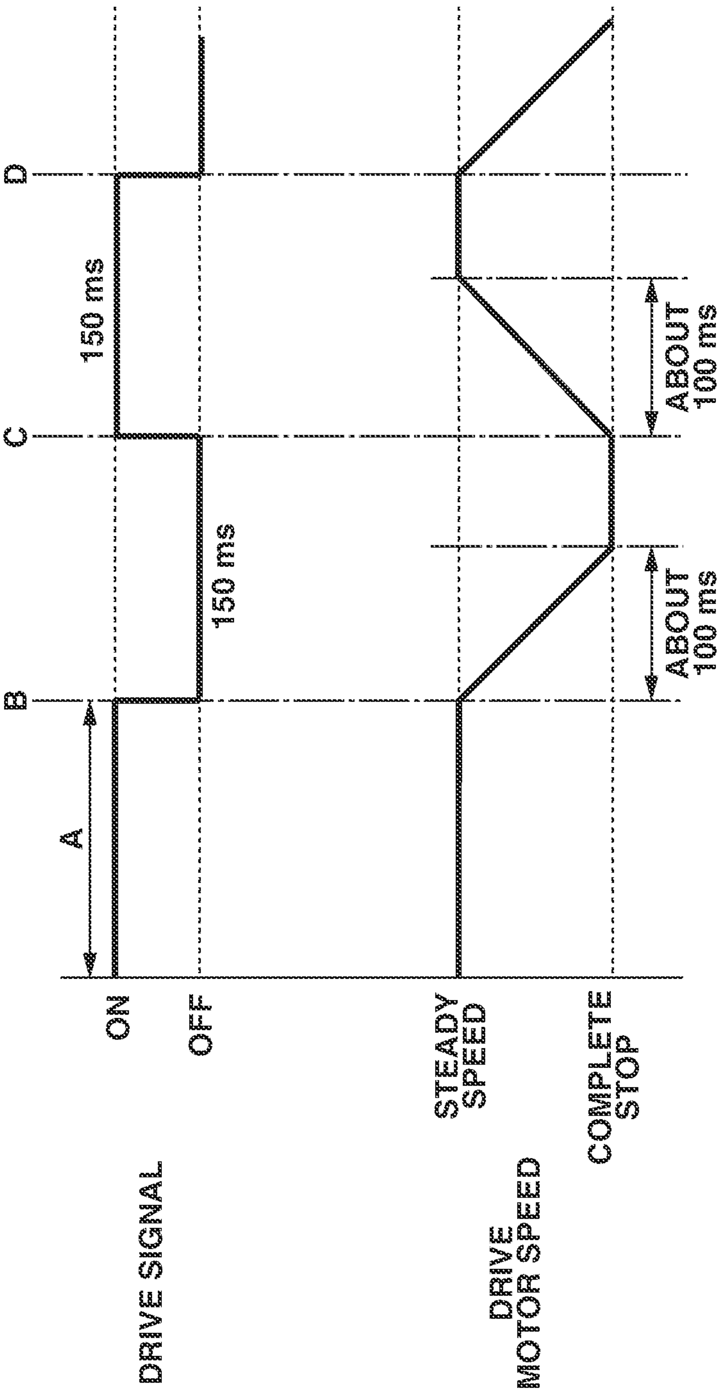
FIG. 6 is an explanatory diagram of a timing chart of cleaning control according to the first exemplary embodiment.

In view of the above-described issue, foreign substance cleaning control of the present exemplary embodiment will be described with reference to FIG. 6. FIG. 6 illustrates a timing chart of a drive signal and a speed of the drive motor 110 of the foreign substance cleaning control of the present exemplary embodiment. A section A in FIG. 6 indicates a post-rotation process section that comes after printing. A timing B is a timing at which a stop instruction is issued to the drive motor 110 at the time of the post-rotation process end, and the drive motor 110 enters a stop operation. A time taken to completely stop from the timing B of the present exemplary embodiment is about 100 msec. In the present exemplary embodiment, because the drive motor 110 performs driving again after the complete stop, a drive instruction is issued to the drive motor 110 (timing C) after 150 msec from the timing B. At this time, in the present exemplary embodiment, the drive motor 110 is started up in the second mode included in the image forming apparatus 100. The drive motor 110 of the present exemplary embodiment requires about 100 msec to be started up from a stopped state to a steady speed of the speed. In the present exemplary embodiment, after the drive motor 110 is started up to the steady speed, a stop instruction is issued again (timing D). Here, a time from the timing C to the timing D is 150 msec, which is longer than a rise time of the drive motor 110. In the present exemplary embodiment, the configuration in which the development roller 31 always has contact with the photosensitive drum 1 at the development portion c is employed. Thus, during foreign substance cleaning control, the following control is executed to prevent a developer from being developed on the photosensitive drum 1, and to collect a foreign substance removed from the charging roller 2, at the development portion c in such a manner that the foreign substance does not adhere to the charging roller 2 again after making a circuit on the photosensitive drum 1. A development bias of +150 V is applied to the development roller 31 during a period immediately after the startup of the drive motor 110 until immediately after a complete stop.

7. Image Evaluation Comparative Test

Next, an effect of foreign substance cleaning control according to the present exemplary embodiment will be described in detail together with a comparative example.

Using the above-described image forming apparatus 100, an effect obtained in a case where foreign substance cleaning control has been performed after the post-rotation process of a job (the first exemplary embodiment), and an effect obtained in a case where (Comparative Example 1) foreign substance cleaning control has not been performed were compared. As a condition, under a high-temperature and humidity environment (32° C., 80% RH), a job to be printed onto one-sided two pages is assumed to be executed using 50000 recording materials P, which corresponds to the operating life of the image forming apparatus 100 of the present exemplary embodiment, and an image evaluation comparative test under this condition was performed. As a recording material, the Century Star paper (manufactured by the CENTURY PULP AND PAPER, product name) was used in the image evaluation.

Next, the method of counting the number of times startup and stop is executed will be described. First of all, because startup, printing, and stop operations are performs in normal printing, the number of times startup and stop are executed is added by one for each job. In the first exemplary embodiment, because foreign substance cleaning control is further performed during a job, the number of times is further added by one.

In this image evaluation comparative test, because a two-paged job is executed using 50000 sheets, the number of times startup and stop are executed becomes 25000 in Comparative Example 1, and becomes 50000 in the first exemplary embodiment. In the present exemplary embodiment, the number of times startup and stop are executed was counted, but it is sufficient that the number of times startup and stop are executed at the time of foreign substance cleaning control is counted without counting the number of times startup and stop are executed in a normal stat. As the counted number in this case, the number of times startup and stop are executed becomes 0 in Comparative Example 1, and becomes 25000 in the first exemplary embodiment.

TABLE 1

| | Number of passed sheets | | | | |
|---|---|---|---|---|---|
| | Up to 10000 | Up to 20000 | Up to 30000 | Up to 40000 | Up to 50000 |
| Comparative Example 1 | 0 | 0 | 1 | 2 | 2 |
| First exemplary embodiment | 0 | 0 | 0 | 0 | 0 |

Table 1 indicates the counted number of black spot lines generated on an image every integrated 10000 sheets passed when this image evaluation test was executed in the first exemplary embodiment and Comparative Example 1. The number of generated black spot lines refers to the number of lines of black spot generated at the pitch of 2 mm in the direction perpendicular to the conveyance direction of the surface of the recording material P. For example, the number of generated black spot lines in the case as illustrated in FIG. 5 is counted as one.

In Comparative Example 1 in this table, black spots start to be generated from the integrated number of passed sheets being 20000 or larger, and the number of generated black spot lines increases from this point. On the other hand, in the first exemplary embodiment, black spots have not been generated.

Hereinafter, a reason the level of the first exemplary embodiment is good will be considered. First of all, the influence of drive speed in foreign substance cleaning control will be described. Here, a result obtained in a case where foreign substance cleaning control was performed in the first mode under the same condition as that of the image comparative evaluation test is indicated in Table 2.

TABLE 2

| Drive speed of foreign substance cleaning control | Number of passed sheets | | | | |
|---|---|---|---|---|---|
| | Up to 10000 | Up to 20000 | Up to 30000 | Up to 40000 | Up to 50000 |
| First mode | 0 | 0 | 0 | 1 | 2 |

From the result indicated in Table 2, by executing foreign substance cleaning control, although black spot generation is suppressed as compared with Comparative Example 1, the suppression has been insufficient as an effect.

When the rotation of the photosensitive drum 1 starts or stops, the photosensitive drum 1 accelerates or decelerates with being accompanied by a speed change, and frictional force drastically fluctuates. It is therefore considered that a foreign substance is easily removed from the charging roller 2 at the charge nip portion a. Nevertheless, a speed change becomes larger as the speed becomes faster, and the foreign substance is removed more easily.

Next, the influence of a print job speed will be described below. To extract print job speed influence, an effect obtained in a case where a print job speed is the speed in the first mode without executing foreign substance cleaning control under the same condition as the condition of the image comparative evaluation test were compared with the effect obtained in a case where the print job speed is the speed in the second mode (Comparative Example 1). The result in the first mode is indicated in Table 3.

TABLE 3

| | Number of passed sheets | | | | |
|---|---|---|---|---|---|
| Print job speed | Up to 10000 | Up to 20000 | Up to 30000 | Up to 40000 | Up to 50000 |
| First mode | 0 | 1 | 2 | 2 | 2 |

As indicated in Table 3, in the first mode, because the foreign substance cleaning control is not executed, the number of generated black spot lines is almost equivalent to that in the second mode (Comparative Example 1). More properly, in the first mode, black spots worsen slightly, but this is considered to be attributed to the above-described speed influence exerted at the time of start and stop. Nevertheless, because the number of times startup and stop are executed is small, the print job speed is not so important.

From the results indicated in Tables 2 and 3, even if startup is executed in a state in which the speed set at the time of drive during the non-image formation period is set to the speed in the first mode, and the speed set when drive is performed again after stop is also set to the speed in the first mode, an effect is expected to be insufficient. On the other hand, in the present exemplary embodiment, startup is executed in a state in which the speed set at the time of drive during the non-image formation period is set to the speed in the second mode, and the speed set when drive is performed again after stop is also set to the speed in the second mode.

As seen from the results in the first exemplary embodiment in Tables 1 and 2, by performing control at high speed in both cases, an effect of foreign substance cleaning has been increased, but a result of comparing contributing degrees will be described below.

If a result obtained in a case where the speed set when drive is performed again after stop is the first mode speed, and a result obtained in a case where the speed set when drive is performed again after stop is the second mode speed, when similar evaluation is executed in a state in which the drive speed during the non-image formation period is set to the speed in the first mode are compared, while black spots have been generated when the number of passed sheets becomes 20000 or more in the case of the first mode speed, black spots have not been generated in the case of the second mode speed. In short, if drive is executed in a state in which the speed set when drive is performed again after stop is set to a faster speed, an effect of foreign substance cleaning can be increased. Accordingly, in the present exemplary embodiment, as the speed set when drive is performed again after stop becomes faster, an effect of foreign substance cleaning becomes higher.

As described above, by executing foreign substance cleaning control at faster speed and at an adequate frequency, the generation of black spots can be suppressed.

8. Effect in Present Exemplary Embodiment

As described above, according to the present exemplary embodiment, by adding foreign substance cleaning control after the post-rotation process of a job, cleaning performance of a foreign substance adhering to the charging roller 2 can improve, and the generation of a black spot image can be suppressed.

In the present exemplary embodiment, a configuration in which the drive motor 110 drives the photosensitive drum 1, and the gears 11 and 12 drive the charging roller 2 is employed. Nevertheless, needless to say, a similar effect can be obtained also in a configuration in which the charging roller 2 is driven by the drive motor 110, and the photosensitive drum 1 is driven via the gears 11 and 12.

In the present exemplary embodiment, the drive motor 110 is started up in such a manner that its speed becomes the speed in the second mode, which is the fastest speed among speeds in print modes included in the image forming apparatus 100. Nevertheless, needless to say, if the drive of the photosensitive drum 1 is executed at a further faster speed, as a special speed to be set during foreign substance cleaning control, an effect can be further obtained.

In the present exemplary embodiment, toner being a nonmagnetic one-component developer serving as a developer is used, but a magnetic one-component developer may be used.

Figure 12:
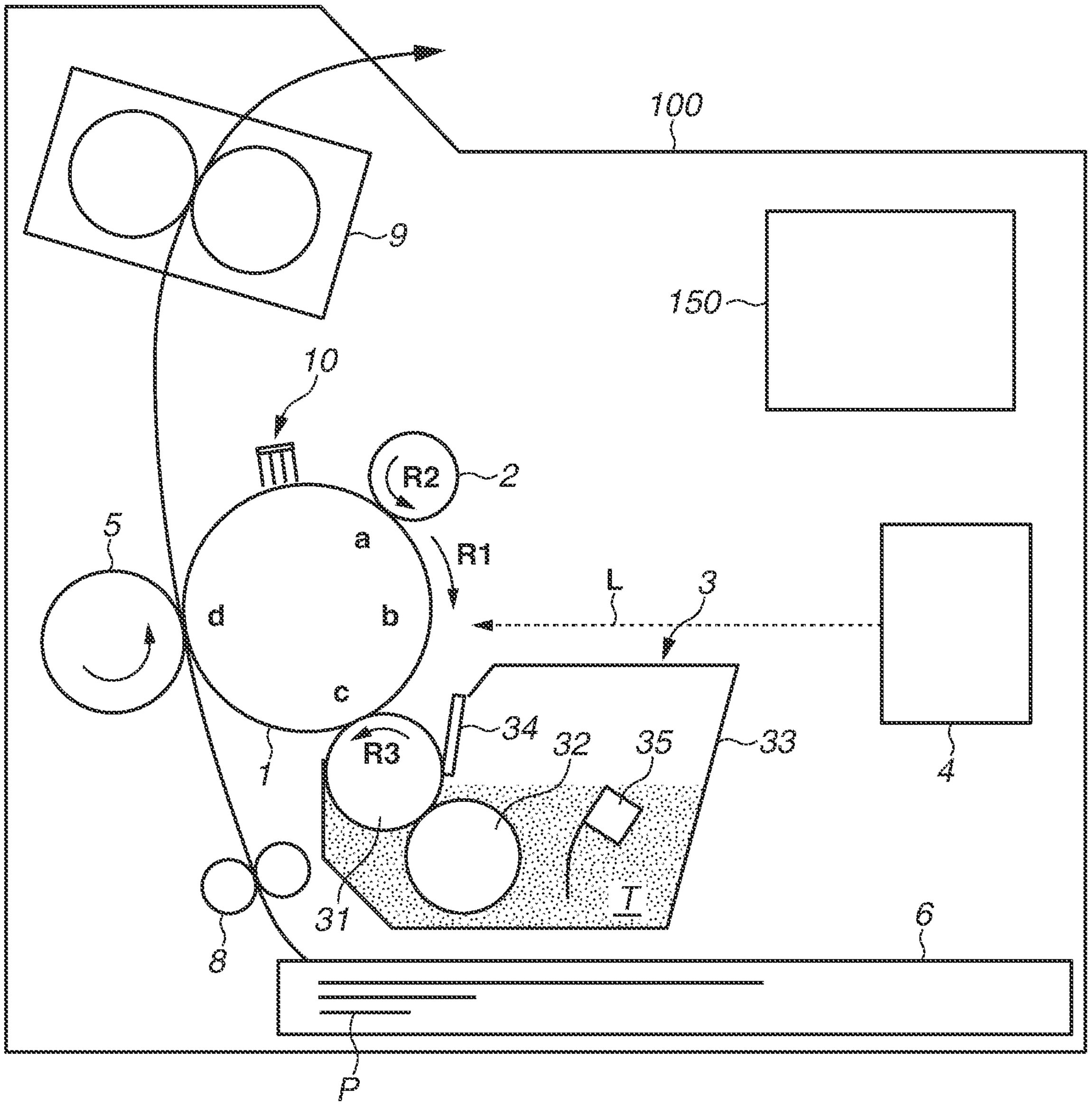
FIG. 12 is a schematic cross-sectional view of an image forming apparatus with another configuration according to the first exemplary embodiment.

In the present exemplary embodiment, in the description has been given of a configuration, in the rotational direction of the photosensitive drum 1, a member having contact with the photosensitive drum 1 is not arranged between the transfer portion d and the charge nip portion a, but the present exemplary embodiment can also be applied to a configuration in which the member is arranged. For example, needless to say, in a case where a foreign substance might reach the charging roller 2 by slipping through the member having contact with the photosensitive drum 1 and the photosensitive drum 1, a similar effect can be obtained. Examples of the member having contact with the photosensitive drum 1 include a selective collection member that collects paper dust and lets a developer through, such as a brush member 10 as illustrated in FIG. 12. For example, in the present exemplary embodiment, the brush member 10 in which conductive threads made of conductive nylon-6 are woven into a foundation cloth formed of synthetic fabric containing carbon is used. Then, an example of the configuration of the brush member 10 includes a configuration of 2 denier, 240 $kF/inch^2$, a conductive thread length of 6.5 mm, and a penetration amount of 1 mm. A conductive thread thickness is desirably 1 to 10 denier, and more desirably is 1 to 6 denier. In addition, the density of conductive threads of the brush member 10 is desirably 150 $kF/inch^2$ or more.

In the present exemplary embodiment, a foreign substance that is easily transferred onto the photosensitive drum 1 at the transfer portion d is highly likely to be a foreign substance electrostatically charged to positive polarity. Thus, the potential relationship between the charging roller 2 and the surface potential of the photosensitive drum 1 passing along the charge nip portion a during a stop operation of foreign substance cleaning control can assist foreign substance cleaning. For example, if a potential difference for transferring a positive polarity foreign substance onto the photosensitive drum 1 is formed by setting a charging voltage of the charging roller 2 to off and setting the surface potential of the photosensitive drum 1 to −300 V, foreign substance cleaning becomes more effective.

9. Speed Relationship Between Charging Roller and Photosensitive Drum, and Foreign Substance Cleaning Performance In the present exemplary embodiment, the description has been given of a configuration in which the surface speed of the charging roller 2 is faster than the surface speed of the photosensitive drum 1. The comparison between foreign substance cleaning effects obtained in this configuration and a configuration in which the surface speed of the charging roller 2 is slower than the surface speed of the photosensitive drum 1 will be described below.

Figure 8:
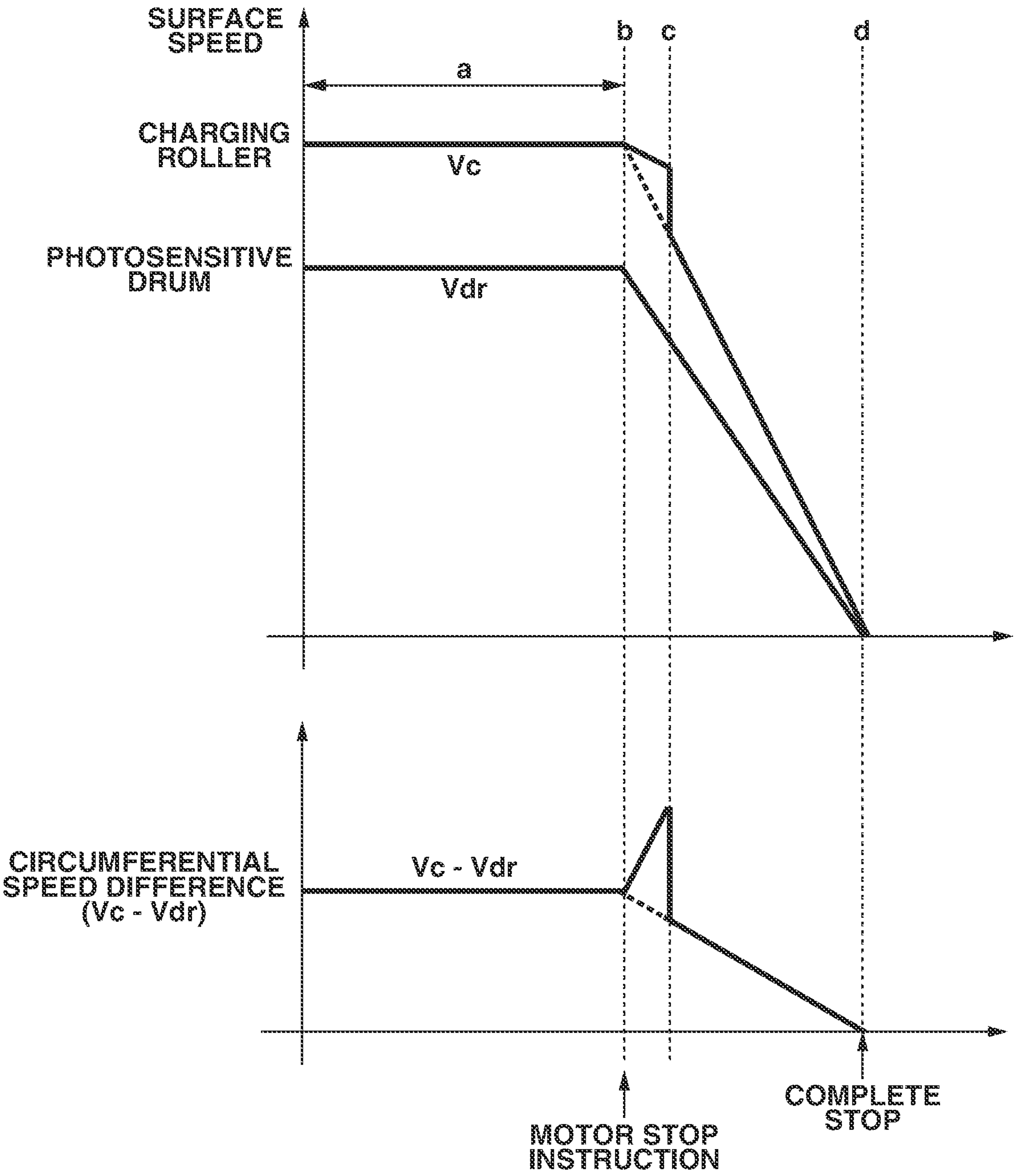
FIG. 8 is a diagram illustrating a speed relationship between a photosensitive drum and a charging roller according to the first exemplary embodiment when a stop operation is to be performed.

A reason cleaning performance of a foreign substance adhering to the charging roller 2 improves in the configuration in which the surface speed of the charging roller 2 is faster than the surface speed of the photosensitive drum 1 will be described below with reference to FIG. 8. FIG. 8 is a diagram illustrating a surface speed Vdr of the photosensitive drum 1, a surface speed Vc of the charging roller 2, and a speed difference Vc−Vdr therebetween in a section from a steady rotation state of the drive motor 110 to a complete stop. In short, FIG. 8 illustrates movement in sections between the sections A to C in FIG. 6.

A section a in FIG. 8 corresponds to the steady rotation state (timing A in FIG. 6), and indicates that rotation is performed at the fixed speed difference (Vc−Vdr) in a state of Vc>Vdr. At this time, the gear flange 11 of the photosensitive drum 1 and the charging roller gear 12 rotate with the gear shape portion 11*a* of the gear flange 11 being engaged with the gear portion 12*a* of the charging roller gear 12 in such a manner as to push the gear portion 12*a* of the charging roller gear 12 as illustrated in FIG. 4.

Next, if a stop instruction is issued to the drive motor 110 at a timing b (timing B in FIG. 6), the rotational speed of the photosensitive drum 1 connected with the drive motor 110 starts to decelerate. At this time, the rotational speed of the charging roller 2 cannot follow the deceleration of the photosensitive drum 1, and a section in which a speed difference temporarily increases is generated. The speed difference increased section is generated in a gap between the gears 11 and 12. If engagement between the gear shape portion 11*a* of the gear flange 11 and the gear portion 12*a* of the charging roller gear 12 changes the state illustrated in FIG. 4, to the state illustrated in FIG. 7, deceleration is performed while keeping a circumferential speed ratio determined by a gear train, and a complete stop is caused.

A foreign substance adhering to the charging roller 2 is removed by frictional force generated by a speed difference between the charging roller 2 and the photosensitive drum 1, at the charge nip portion a at which the charging roller 2 and the photosensitive drum 1 have contact. Even during steady rotation, the foreign substance is removed to some extent due to the speed difference at the charge nip portion a, but the foreign substance sometimes fails to be removed. Thus, the foreign substance cleaning control of the present exemplary embodiment intentionally forms a section (section between the timings b and c) in which a speed difference temporarily increases during a stop operation, and frictional force is increased.

Furthermore, by increasing the frequency of the stop operation, a foreign substance that cannot be removed during a steady rotation can be removed. In the configuration of the present exemplary embodiment, a time between the timings b and c is about 6 msec. The present exemplary embodiment is characterized in that the drive motor 110 is started up not in the first mode but in the second mode to generate larger frictional force by increasing a speed difference at the charge nip portion a to a speed difference as large as possible. In other words, by performing drive in a mode in which the speed is faster than the speed in a mode in which the speed is the slowest among process speeds included in the image forming apparatus 100, a foreign substance cleaning effect can be further obtained as compared with the mode in which the speed is the slowest. Here, the speed in the second mode is only required to be faster than the speed in the first mode in which the speed is the slowest, and as the speed becomes faster, an effect improves.

As for both of a drive speed set before a print job stop, and a speed set when drive is performed again after stop, as the speed becomes faster, a foreign substance cleaning effect improves. Nevertheless, at the time of print job stop, a foreign substance that has failed to be removed from the surface of the charging roller 2 sometimes remains on the surface of the charging roller 2 in an unstable adhesion state. If a print job operation is continuously started in this state, the adhesion of the foreign substance might be stabilized during steady rotation.

Thus, as in the present exemplary embodiment, before the adhesion of the foreign substance is stabilized again, by performing drive again at a faster speed after stop, and causing a stop, the foreign substance in the unstable adhesion state can be effectively cleaned. In the above-described configuration, the description has been given using only an image formation mode as a mode of which the speed is to be compared. Nevertheless, this is not applicable to the case of the image forming apparatus 100 including a mode in which a special operation of some sort is to be performed, in which an operation is performed at a speed different from that in the image formation mode. That is, the mode in which the speed is the slowest among operation modes including these corresponds to the first mode, and if an operation is performed at a speed faster than the speed in the first mode, an effect can be similarly obtained.

Figure 9:
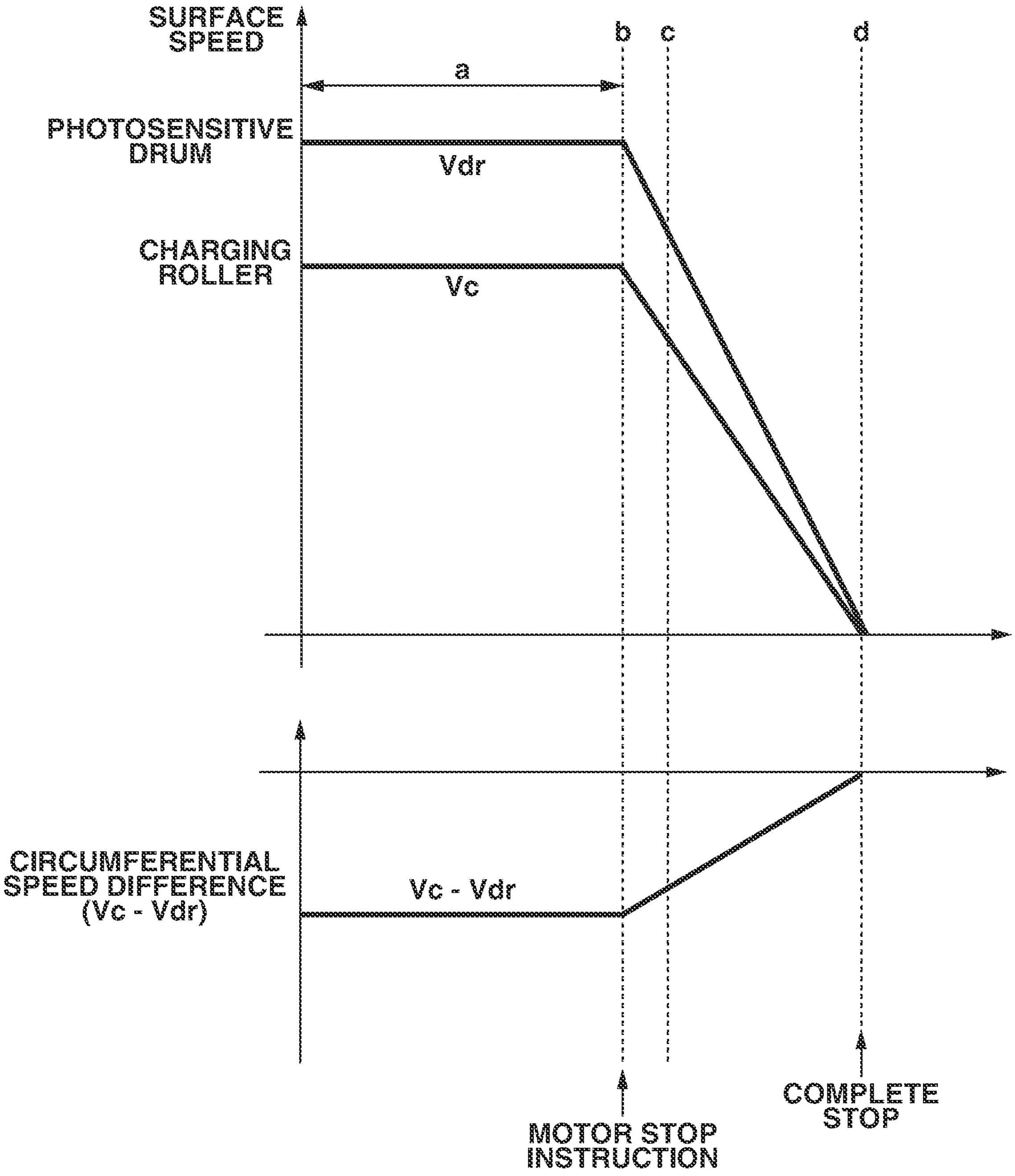
FIG. 9 is a diagram illustrating a speed relationship between a photosensitive drum and a charging roller according to the first exemplary embodiment.

FIG. 9 is a diagram illustrating a surface speed Vdr of the photosensitive drum 1, a surface speed Vc of the charging roller 2, and a speed difference Vc−Vdr therebetween in a section from a steady rotation state of the drive motor 110 to a complete stop in the configuration in which the surface speed of the charging roller 2 is slower than the surface speed of the photosensitive drum 1. The timings are the same as those in FIG. 8.

Figure 7:
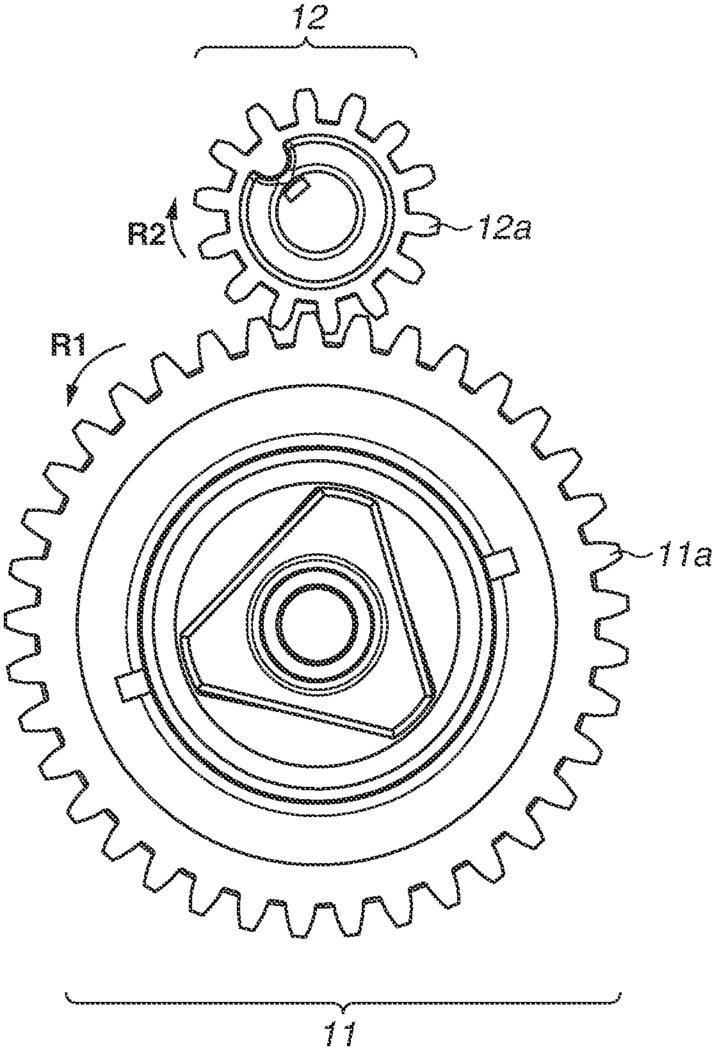
FIG. 7 is an explanatory diagram of a drive train of a photosensitive drum and a charging roller according to the first exemplary embodiment.

A section a in FIG. 9 corresponds to the steady rotation state, and indicates that rotation is performed at the fixed speed difference (Vc−Vdr) in the state of Vc<Vdr. At this time, the gear flange 11 of the photosensitive drum 1 and the charging roller gear 12 rotate with the gear portion 12*a* of the charging roller gear 12 being engaged with the gear shape portion 11*a* of the gear flange 11 in such a manner as to push the gear shape portion 11*a* of the gear flange 11 as illustrated in FIG. 7, in contradiction to the present exemplary embodiment. This is because, in a case where the surface speed of the charging roller 2 is slower than the surface speed of the photosensitive drum 1, the photosensitive drum 1 receives force in the rotational direction from the charging roller 2 at the charge nip portion a, and the charging roller 2 receives counterforce in a direction opposite to the rotational direction. Thus, force directions become opposite to those in a case where the charging roller 2 rotates faster than the photosensitive drum 1, and the engagement between the gears 11 and 12 consequently becomes opposite to that in the configuration in which the surface speed of the charging roller 2 is faster than the surface speed of the photosensitive drum 1.

Next, if a stop instruction is issued to the drive motor 110 at the timing b, the rotational speed of the photosensitive drum 1 coupled with the drive motor 110 starts to decelerate. At this time, because the engagement between the gears 11 and 12 becomes opposite to that in the present exemplary embodiment, the rotational speed of the charging roller 2 decelerates while keeping a fixed circumferential speed ratio with the photosensitive drum 1 that is determined by a gear train, and a complete stop is caused.

As described above, because a speed difference is not increased during a stop operation in the configuration in which the surface speed of the charging roller 2 is slower than the surface speed of the photosensitive drum 1, foreign substance cleaning performance is considered to be inferior to that in the present exemplary embodiment.

Thus, in the configuration in which the surface speed of the charging roller 2 is faster than the surface speed of the photosensitive drum 1, a foreign substance is removed more easily than in the configuration in which the surface speed of the charging roller 2 is slower than the surface speed of the photosensitive drum 1. Its reasons also include the following shape change of the charging roller 2 that is caused near the charge nip portion a, aside from a speed variation generated between the charging roller 2 and the photosensitive drum 1.

Figure 10A:
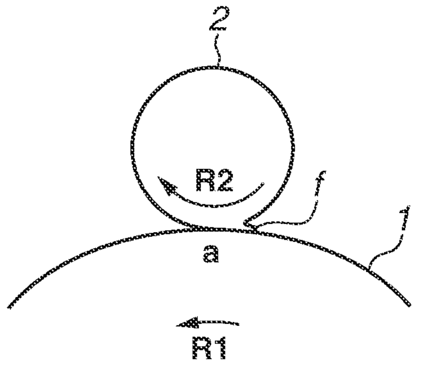
FIGS. 10A and 10B are diagrams each illustrating a deformed state of the charging roller according to the first exemplary embodiment.
Figure 10B:
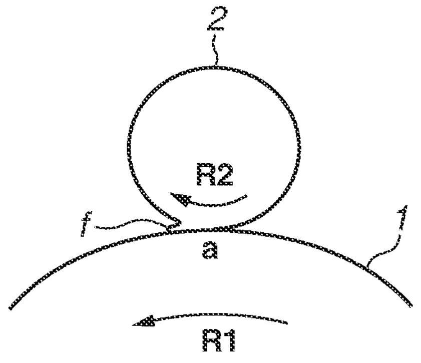

FIGS. 10A and 10B are diagrams schematically illustrating the deformation of the charging roller 2 at the charge nip portion a in the configuration in which the surface speed of the charging roller 2 is faster than the surface speed of the photosensitive drum 1, and the configuration in which the surface speed of the charging roller 2 is slower than the surface speed of the photosensitive drum 1. FIG. 10A is a diagram schematically illustrating the deformation of the charging roller 2 in the configuration in which the surface speed of the charging roller 2 is faster than the surface speed of the photosensitive drum 1. In FIG. 10A, because the charging roller 2 receives force from the photosensitive drum 1 in a direction opposite to the rotational direction at the charge nip portion a, deformation is generated on the upstream side of the charge nip portion a in the rotational direction of the photosensitive drum 1.

On the other hand, FIG. 10B is a diagram schematically illustrating the deformation of the charging roller 2 in the configuration in which the surface speed of the charging roller 2 is slower than the surface speed of the photosensitive drum 1. In FIG. 10B, because the charging roller 2 receives force from the photosensitive drum 1 in the rotational direction at the charge nip portion a, deformation is generated on the downstream side of the charge nip portion a in the rotational direction of the photosensitive drum 1. At a deformed portion f formed by the deformation, the adhesion state of the foreign substance adhering to the charging roller 2 is expected to become unstable in accordance with the temporal surface shape change of the charging roller 2.

The foreign substance adhering to the charging roller 2 is finally removed when friction is generated between the charging roller 2 and the photosensitive drum 1 at the charge nip portion a. Accordingly, if the deformed portion f is formed immediately before the foreign substance enters the charge nip portion a (i.e., the deformed portion f is formed on the upstream side of the charge nip portion a in the rotational direction of the photosensitive drum 1), the foreign substance is expected to be removed more easily.

Especially when the rotation of the photosensitive drum 1 starts or stops, the photosensitive drum 1 accelerates or decelerates with being accompanied by a speed change, and frictional force drastically fluctuates. Accordingly, stress at the charge nip portion a becomes larger than the stress applied during steady rotation, and a deformation amount of the deformed portion f is considered to be larger as well. Thus, similarly to the description of the present exemplary embodiment, by executing foreign substance cleaning control in which stop and drive are performed, foreign substance cleaning performance is considered to improve.

Also in the above-described foreign substance removal process, as for both of a drive speed set before a print job stop, and a speed set when drive is performed again after stop, as the drive speed becomes faster, a larger foreign substance cleaning effect is obtained. Nevertheless, at the time of print job stop, a foreign substance that has failed to be removed sometimes remains in an unstable adhesion state. If a print job operation is continuously started in this state, although the foreign substance is possibly removed at the time of restart, in a case where the foreign substance fails to be removed, the adhesion of the foreign substance might be stabilized during steady rotation executed thereafter.

Thus, by performing drive again at a faster speed after stop, and causing a stop as in the present exemplary embodiment, startup and stop operations in which the foreign substance is easily removed can be additionally performed. Accordingly, the foreign substance in the unstable adhesion state can be effectively cleaned.

As described above, the present exemplary embodiment has the following features.

The rotatable photosensitive drum 1, and the charging roller 2 that charges the surface of the photosensitive drum 1 at the charge nip portion a formed by having contact with the photosensitive drum 1 are included. The development roller 31 that supplies toner onto the surface of the photosensitive drum 1 charged by the charging roller 2, and the transfer roller 5 that forms the transfer portion d by having contact with the photosensitive drum 1, and transfers the toner formed on the photosensitive drum 1, onto the recording material P at the transfer portion d are included. The first gear 11 that rotates the photosensitive drum 1, the second gear 12 that rotates the charging roller 2 and engages with the first gear 11, and the drive motor 110 that rotationally drives the photosensitive drum 1 and the charging roller 2 by transmitting drive to the first gear 11 are included. The control unit 150 that controls the drive motor 110 is included, and an image forming operation of performing image formation by rotating the photosensitive drum 1 at a first rotational speed is executable. In a case where the control unit 150 executes the image forming operation, while a non-image forming operation to be executed after the image forming operation is executed, the control unit 150 performs control in such a manner that the following operation is executed. A switch operation of stopping the photosensitive drum 1 in a state in which the photosensitive drum 1 is driven, and rotationally driving the photosensitive drum 1 again at a second rotational speed faster than the first rotational speed is performed a plurality of times.

In the image forming operation, if an image formation mode in which the photosensitive drum 1 is rotated at the first rotational speed is regarded as a first image formation mode, a second image formation mode in which image formation is performed by rotating the photosensitive drum 1 at the second rotational speed can be controlled. The second image formation mode is a normal mode to be executed in a normal state, and the first image formation mode is a low-speed mode different from the normal mode. If a series of image forming operations are defined to include a first image forming operation, a second image forming operation to be performed after the first image forming operation, and a non-image forming operation to be executed between the first image forming operation and the second image forming operation, in the present exemplary embodiment, control is performed as follows. In a case where the control unit 150 executes a series of image forming operations, while the non-image forming operation is executed, the control unit 150 performs control in such a manner as to perform the switch operation of stopping the photosensitive drum 1 in a state in which the photosensitive drum 1 is driven, and driving the photosensitive drum 1 again at the second rotational speed, a plurality of times. In a case where the control unit 150 executes the image forming operation, while a non-image forming operation to be executed after the image forming operation is executed, the control unit 150 stops the photosensitive drum 1 after driving the photosensitive drum 1 at the second rotational speed, and drives the photosensitive drum 1 again at the second rotational speed. In a case where the control unit 150 executes a series of image forming operations, while the non-image forming operation is executed, the control unit 150 may stop the photosensitive drum 1 in a state in which the photosensitive drum 1 is driven, and drive the photosensitive drum 1 again at a third rotational speed faster than the first rotational speed. In addition, while the non-image forming operation is executed, the control unit 150 may stop the photosensitive drum 1 in a state in which the photosensitive drum 1 is driven at the third rotational speed, and drive the photosensitive drum 1 again at the third rotational speed. Here, the third rotational speed may be the same speed as the second rotational speed. In addition, the third rotational speed may be a drive speed further faster than the fastest drive speed among drive speeds of the drive motor 110 to be controlled during the image forming operation. In a case where the photosensitive drum 1 is rotated, the surface speed of the charging roller 2 becomes faster than the surface speed of the photosensitive drum 1. In the switch operation, the control unit 150 performs control in such a manner as to stop the photosensitive drum 1 in a state in which the photosensitive drum 1 is driven, and raise the speed of the photosensitive drum 1 up to the steady state when driving the photosensitive drum 1 again.

In the present exemplary embodiment, a configuration in which the image forming apparatus 100 is provided with the photosensitive drum 1, the development device 3, and the charging roller 2 has been described, but a configuration of a process cartridge may be employed. In other words, a process cartridge that is detachably attached to the image forming apparatus 100, and includes the photosensitive drum 1, the development device 3, and the charging roller 2 may be employed. Alternatively, a configuration of a drum cartridge including the photosensitive drum 1 and the charging roller 2, and a development cartridge including the development device 3 may be employed. In this case, the drum cartridge and the development cartridge may be individually detachably attached to the image forming apparatus 100, or only one of them may be detachably attached to the image forming apparatus 100.

Next, another exemplary embodiment of the present disclosure will be described. A basic configuration and operations of the image forming apparatus according to the present exemplary embodiment are the same as those of the image forming apparatus 100 according to the first exemplary embodiment. Accordingly, in the image forming apparatus according to the present exemplary embodiment, the components having functions or configurations identical or corresponding to those of the image forming apparatus 100 according to the first exemplary embodiment are assigned the same reference numerals as those of the image forming apparatus 100 according to the first exemplary embodiment, and the detailed description will be omitted.

1. Foreign Substance Cleaning Control of Present Exemplary Embodiment

To facilitate the understanding of the control according to the present exemplary embodiment, an issue to be addressed by the present exemplary embodiment will be described in detail below. In the first exemplary embodiment, an effect of foreign substance cleaning control in a two-paged job has been described. A foreign substance is mainly transferred onto the photosensitive drum 1 via the recording material P. Thus, as the number of pages to be printed in a job increases, an amount of transferred foreign substances in one job increases. In a case where a foreign substance adhering to the charging roller 2 is not removed quickly, the foreign substance might damage the surface of the photosensitive drum 1, and might become difficult to be removed. In other words, in a case where the number of pages to be printed in a job is large, foreign substance removal performance obtained by foreign substance cleaning control might become insufficient. In view of the foregoing, the present exemplary embodiment is characterized in that the number of times startup and stop operations are performed in foreign substance cleaning control is switched in accordance with the number of pages to be printed in a job. More specifically, as the number of pages to be printed in a job input by an external device such as a personal computer at one time, and to be executed as one job becomes larger, the number of times startup and stop operations are performed in foreign substance cleaning control is made larger.

Figure 11:
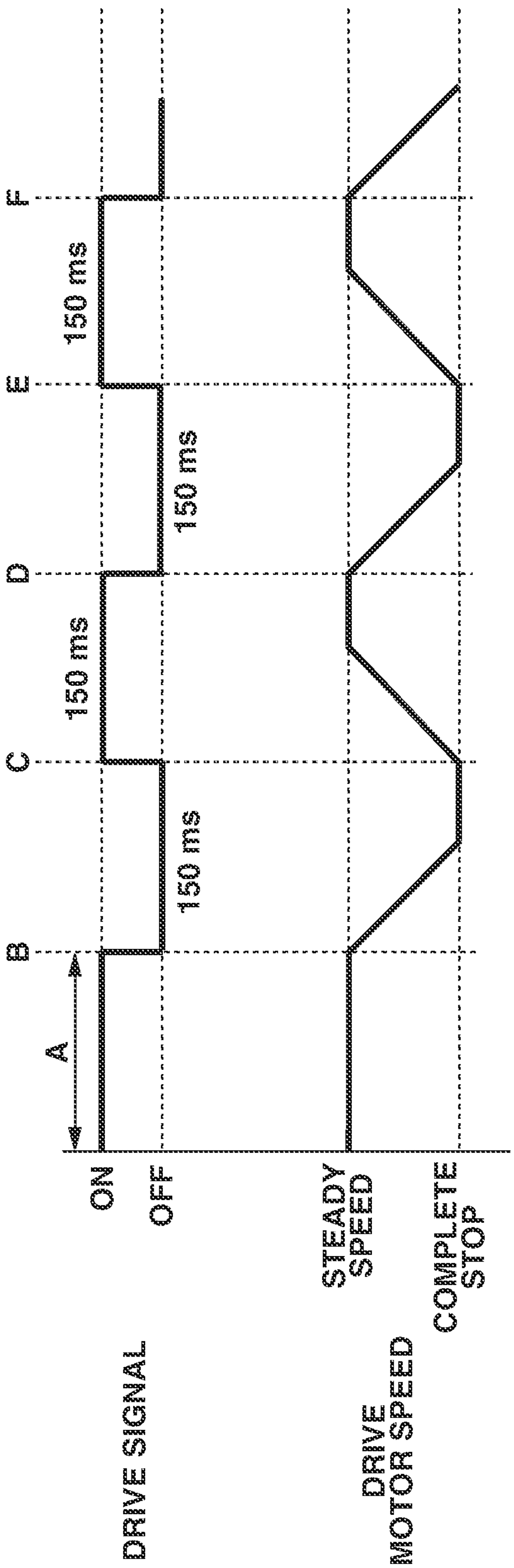
FIG. 11 is an explanatory diagram of a timing chart of cleaning control according to a second exemplary embodiment.

Foreign substance cleaning control according to the present exemplary embodiment will be described below with reference to FIG. 11. FIG. 11 illustrates a timing chart of a drive signal and a speed of the drive motor 110 of foreign substance cleaning control executed after a four-paged print job, as an example. Operations performed up to a timing D in FIG. 11 are similar to the operations performed up to the timing D in FIG. 6. In the present exemplary embodiment, as illustrated in FIG. 11, after the timing D, a startup-stop operation is further added once in a section from timings E to F, and the startup-stop operation is executed twice in total. In the four-paged job, under the condition of 50000 sheets passage, which is the condition of the image evaluation comparative test in the first exemplary embodiment, the total number of times the startup-stop operation is executed in a case where the number of times startup and stop are executed in foreign substance cleaning control is once, and in a case where the number of times startup and stop are executed in foreign substance cleaning control is twice is calculated. Then, the calculated total number becomes 25000 in a case where the number of times is once, which is the same as that in the first exemplary embodiment, and becomes 50000 in a case where the number of times is twice, and improvement in foreign substance removability is expected.

2. Image Evaluation Comparative Test

Next, a comparison result of suppression effects of adverse effects on images caused by black spots that are obtained using different number of times of foreign substance cleaning control will be described in detail.

The image evaluation comparative test in the present exemplary embodiment was executed using a job to be printed onto one-sided four pages, under the following condition based on the evaluation test of the first exemplary embodiment. The number of black spot lines generated in Comparative Example 2 in which foreign substance cleaning control of the first exemplary embodiment is not additionally executed, the number of black spot lines generated in the first exemplary embodiment in which the number of times startup and stop are executed in foreign substance cleaning control is once, and the number of black spot lines generated in a second exemplary embodiment in which the number of times startup and stop are executed in foreign substance cleaning control is set to twice by further adding one to the configuration of the first exemplary embodiment were compared.

TABLE 4

| | Number of passed sheets | | | | |
|---|---|---|---|---|---|
| | Up to 10000 | Up to 20000 | Up to 30000 | Up to 40000 | Up to 50000 |
| Comparative Example 2 | 0 | 1 | 2 | 2 | 3 |
| First exemplary embodiment (once) | 0 | 0 | 0 | 1 | 1 |
| Second exemplary embodiment (twice) | 0 | 0 | 0 | 0 | 0 |

Table 4 indicates the counted number of black spot lines generated on an image every integrated 10000 sheets passed when this image evaluation test was executed in foreign substance cleaning control of Comparative Example 2, the first exemplary embodiment (once), and the second exemplary embodiment (twice).

From Table 4, a result in which, as the frequency of the startup-stop operation in foreign substance cleaning control is increased, an effect of suppressing the generation of a black spot image improves was obtained.

As described above, by changing the frequency of foreign substance cleaning control in accordance with the number of pages to be printed in a job, also in a case where the number of pages to be printed in a job is larger than two, the generation of black spots can be suppressed.

In addition, as for jobs other than the two-paged job and the four-paged job, the adequate number of times startup and stop are executed in foreign substance cleaning control can be set based on the total number of times startup and stop are executed. Table 5 is a table indicating a relationship between the number of pages to be printed in a job (1 to 10), the number of times startup and stop are executed in foreign substance cleaning control, and the total number of times startup and stop are executed in a case where 50000 sheets are passed. In a case where 50000 sheets are passed, from the result of the two-paged job in the first exemplary embodiment, when the number of times startup and stop are executed is 25000, black spots are generated in some cases. Thus, Table 5 indicates a case where the number of times startup and stop are executed in foreign substance cleaning control is set in such a manner that the total number of times startup and stop are executed becomes larger than 25000, in a case where 50000 sheets are passed whichever number is set as the number of pages to be printed in a job, for example.

TABLE 5

| Number of pages to be printed in job | Number of times startup and stop are executed in foreign substance cleaning control | Total number of times startup and stop are executed (50000 sheets passed) |
|---|---|---|
| 1 | 0 | 50,000 |
| 2 | 1 | 50,000 |
| 3 | 1 | 33,333 |
| 4 | 2 | 37,500 |
| 5 | 2 | 30,000 |
| 6 | 3 | 33,333 |
| 7 | 3 | 28,571 |
| 8 | 4 | 31,250 |
| 9 | 4 | 27,778 |
| 10 | 5 | 30,000 |

As described above, whichever number is set as the number of pages to be printed in a job, by setting the number of times startup and stop are executed that can maintain foreign substance cleaning performance, the generation of black spots can be suppressed. Specifically, by executing startup and stop the number of times obtained by multiplying the total number of pages to be printed in a job, by 0.5, in the present exemplary embodiment, an adverse effect on an image can be suppressed. The number of times startup and stop are executed in foreign substance cleaning control that corresponds to the number of pages to be printed in a job is prestored into the nonvolatile memory 152. In addition, the number of times startup and stop are executed that corresponds to the limit of the total number of pages to be printed in a job (main body operating life of the image forming apparatus 100, operating life of the process cartridge) may be stored into the nonvolatile memory 152, or the above-described coefficient such as 0.5 times may be stored into the nonvolatile memory 152.

For example, adhesion force of a foreign substance to the charging roller 2 is considered to change depending on the temperature and humidity. In such a case, if it is detected that the environment is an environment in which a foreign substance is hardly removed, depending on the temperature and humidity detected by the image forming apparatus 100, the number of times of foreign substance cleaning control may be increased. In this case, the image forming apparatus 100 may be provided with an environmental sensor (not illustrated) (temperature sensor and humidity sensor).

Next, another exemplary embodiment of the present disclosure will be described. A basic configuration and operations of the image forming apparatus according to the present exemplary embodiment are the same as those of the image forming apparatus 100 according to the first exemplary embodiment. Accordingly, in the image forming apparatus according to the present exemplary embodiment, the components having functions or configurations identical or corresponding to those of the image forming apparatus 100 according to the first exemplary embodiment are assigned the same reference numerals as those of the image forming apparatus 100 according to the first exemplary embodiment, and the detailed description will be omitted.

1. Foreign Substance Cleaning Control of Present Exemplary Embodiment

The present exemplary embodiment is characterized in that foreign substance cleaning control to be executed in a brand-new image forming apparatus 100 is executed up to some midpoint of the operating life of the image forming apparatus 100, and the execution is stopped at the midpoint.

In other words, the present exemplary embodiment is characterized in that an execution condition of foreign substance cleaning control is varied depending on a usage status of the image forming apparatus 100. More specifically, the present exemplary embodiment is characterized in that, as the usage of the image forming apparatus 100 progresses, the number of times foreign substance cleaning control is executed is made smaller.

The foreign substance cleaning control is executed with a view to removing a foreign substance adhering to the charging roller 2, but the foreign substance cleaning control is control to be executed by being added to a normal print operation, and interruption and operating life influence are also generated in no small part. It is therefore more desirable to execute foreign substance cleaning control at a timing necessary for suppressing black spots, in accordance with the specification such as the operating life of the image forming apparatus 100.

For example, from the result of the first exemplary embodiment that is indicated in Table 1, in the case of a two-paged job, in a case where foreign substance cleaning control is not additionally executed, when the total number of pages to be printed in a job becomes about 20000 or more, black spots are generated.

Thus, for example, in the present exemplary embodiment, in a case where the operating life of the image forming apparatus 100 corresponds to 50000 sheets, if foreign substance cleaning control is executed and foreign substance adhesion is suppressed up to 30000 sheets, even if foreign substance cleaning control is not executed on subsequent sheets, the generation of black spots can be suppressed up to 50000 sheets.

Specifically, the above-described result indicates that, even if printing is executed on 20000 sheets without executing foreign substance cleaning control, the image forming apparatus 100 can be used without any issue up to 50000 sheets. Thus, if a foreign substance is removed from the surface of the charging roller 2 by executing foreign substance cleaning control before a 30000th page, an adverse effect on an image is not caused even if foreign substance cleaning control is not executed on the remaining 20000 sheets.

Depending on the durability of foreign substance adhesion to the charging roller 2, a switch timing of execution/non execution of foreign substance cleaning control may be determined. The above-described switch timing may be determined depending on the property of the charging roller 2, such as a property indicating that a foreign substance easily adheres to the surface of the charging roller 2 when the charging roller 2 is new, for example. In a case where the charging roller 2 has such a property that, as the charging roller 2 is used, a developer, an external additive, or a loading material of the recording material P adheres to the charging roller 2, and a foreign substance becomes unlikely to adhere, foreign substance cleaning control can be actively executed at an early stage at which a foreign substance easily adheres. In this case, the switch timing of execution/non execution of foreign substance cleaning control may be defined not based on the number of passed sheets, but based on information regarding the operating life of the image forming apparatus 100, such as the number of rotations and a rotation time of the photosensitive drum 1, for example. Aside from these, the information regarding the operating life of the image forming apparatus 100 may be the number of rotations and a rotation time of the development roller 31 or the charging roller 2, or may be a surface movement length (distance) of each member.

The present exemplary embodiment is characterized in that control is changed to control of not executing foreign substance cleaning control, in a case where the number of printed sheets exceeds a certain threshold value, but the control is not limited to control of changing the number of times of foreign substance cleaning control. For example, the number of times foreign substance cleaning control is executed may be changed depending on the total number of printed sheets. Specifically, control of changing the number of printed sheets on which foreign substance cleaning control is executed, at a certain threshold, may be performed. For example, up to a predetermined threshold (the total number of printed sheets: first threshold) since the image forming apparatus 100 is new, control of executing foreign substance cleaning control every time during a post-rotation operation is executed. Then, after the total number of printed sheets has reached the first threshold, foreign substance cleaning control may be executed until the number of printed sheets becomes the number obtained by adding 1000 to the first threshold. Then, in a case where the number of printed sheets further progresses from the first threshold, and has reached a next predetermined threshold (second threshold), foreign substance cleaning control may be executed until the number of printed sheets becomes the number obtained by adding 500 to the second threshold. In other words, in accordance with the total number of printed sheets of the image forming apparatus 100, the number of printed sheets on which foreign substance cleaning control is executed may be changed. A first total number of printed sheets, and a second total number of printed sheets larger than the first total number of printed sheets are assumed. In this case, control is performed in such a manner that the number of printed sheets on which foreign substance cleaning control is executed in the case of the first total number of printed sheets, and the number of printed sheets on which foreign substance cleaning control is executed in the case of the second total number of printed sheets become different. More specifically, control is performed in such a manner that a condition of foreign substance cleaning control that is set up to the first total number of printed sheets, and a condition of foreign substance cleaning control that is set from the first total number of printed sheets to the second total number of printed sheets become different. Furthermore, it is desirable to perform control in such a manner that the number of printed sheets on which foreign substance cleaning control is executed from the usage early stage of the image forming apparatus 100 up to the first total number of printed sheets becomes larger than the number of printed sheets on which foreign substance cleaning control is executed from the first total number of printed sheets to the second total number of printed sheets. For example, from the usage start of the image forming apparatus 100 (the number of printed sheets being 0), foreign substance cleaning control is executed in every post-rotation operation until the number of printed sheets becomes 50000 sheets (the first total number of printed sheets). Then, foreign substance cleaning control to be executed when the total number of printed sheets is 50001 to 60000 (the second total number of printed sheets) is made different from foreign substance cleaning control to be executed when the number of printed sheets is 0 to 50000. In this case, a threshold is set to 50000. As a specific example, control is performed in such a manner that foreign substance cleaning control is executed in every post-rotation operation when the total number of printed sheets is 50001 to 51000, and foreign substance cleaning control is not executed when the total number of printed sheets is 51001 to 60000.

Alternatively, up to the first total number of printed sheets, control of executing foreign substance cleaning control in every post-rotation operation may be performed, and from the first total number of printed sheets to the second total number of printed sheets, control of executing foreign substance cleaning control once every two post-rotation operations may be executed. For example, when the total number of printed sheets is 50001 to 60000 (the second total number of printed sheets), foreign substance cleaning control is executed once every two post-rotation operations. Specifically, if two sheets are printed by an intermittent operation, control is performed in such a manner that foreign substance cleaning control is not executed in post-rotation operations of 50002 sheets, and foreign substance cleaning control is executed in post-rotation operations of 50004 sheets. By executing the above-described control, the number of printed sheets on which foreign substance cleaning control is executed up to the first total number of printed sheets becomes larger than the number of printed sheets on which foreign substance cleaning control is executed from the first total number of printed sheets to the second total number of printed sheets. In addition, when the total number of printed sheets is 50001 to 60000 (the second total number of printed sheets), execution/non execution of foreign substance cleaning control may be switched every predetermined number of printed sheets. For example, execution/non execution of foreign substance cleaning control may be switched each time 100 sheets are printed.

In addition, in the usage latter half of the image forming apparatus 100 in which an amount of foreign substances becomes larger, control different from the above-described control may be executed. For example, control may be performed in such a manner that the number of printed sheets on which foreign substance cleaning control is executed in the case of the first total number of printed sheets becomes smaller than the number of printed sheets on which foreign substance cleaning control is executed in the case of the range from the first total number of printed sheets to the second total number of printed sheets.

As described above, by defining an execution section of foreign substance cleaning control during the operating life of the image forming apparatus 100 depending on the specification of the image forming apparatus 100 or the property of a member, it is possible to minimize interruption and influence on the operating life while suppressing the generation of black spots.

As described above, according to the present disclosure, it is possible to suppress an adverse effect on an image that is caused by a foreign substance adhering to a charging roller.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-154910, filed Sep. 28, 2022, and No. 2023-019681, filed Feb. 13, 2023, which are hereby incorporated by reference herein in their entirety.

What is claimed is:

1. An image forming apparatus comprising:

a photosensitive drum that is rotatable;

a charging member configured to form a charging portion by having contact with the photosensitive drum, and to charge a surface of the photosensitive drum at the charging portion;

a developing member configured to supply toner to form on the surface of the photosensitive drum charged by the charging member;

a transfer member configured to form a transfer portion by having contact with the photosensitive drum, and transfer the toner formed on the photosensitive drum, onto a member to be transferred at the transfer portion;

a first gear configured to rotate the photosensitive drum;

a second gear configured to rotate the charging member and to engage with the first gear;

a drive source configured to rotationally drive the photosensitive drum and the charging member by transmitting drive to the first gear; and a control unit configured to control the drive source, wherein the control unit performs control in such a manner that an image forming operation of performing image formation by rotating the photosensitive drum at a first rotational speed is executable, and wherein, the control unit performs control in such a manner as to perform a switch operation of stopping the photosensitive drum in a state in which the photosensitive drum is driven, while a non-image forming operation to be executed after the image forming operation is executed, and rotationally driving the photosensitive drum again at a second rotational speed faster than the first rotational speed, a plurality of times.

2. The image forming apparatus according to claim 1, wherein, in the image forming operation, when an image formation mode in which the photosensitive drum is rotated at the first rotational speed is regarded as a first image formation mode, the control unit can control a second image formation mode in which image formation is performed by rotating the photosensitive drum at the second rotational speed.

3. The image forming apparatus according to claim 2, wherein the second image formation mode is a normal mode to be executed in a normal state, and the first image formation mode is a low-speed mode different from the normal mode.

4. The image forming apparatus according to claim 2, wherein, in a case where the control unit executes a series of image forming operations in which the series of image forming operations are defined to include a first image forming operation, a second image forming operation that is the image forming operation to be performed after the first image forming operation, and a non-image forming operation to be executed between the first image forming operation and the second image forming operation, the control unit performs control in such a manner as to perform the switch operation of stopping the photosensitive drum in a state in which the photosensitive drum is driven, while the non-image forming operation to be executed after the image forming operation is executed, and rotationally driving the photosensitive drum again at the second rotational speed, the plurality of times.

5. The image forming apparatus according to claim 2, wherein, in a case where the control unit executes a series of image forming operations in which the series of image forming operations are defined to include a first image forming operation, a second image forming operation that is the image forming operation to be performed after the first image forming operation, and a non-image forming operation to be executed between the first image forming operation and the second image forming operation, the control unit performs control in such a manner as to perform a switch operation of stopping the photosensitive drum in a state in which the photosensitive drum is driven, while the non-image forming operation to be executed after the image forming operation is executed, and rotationally driving the photosensitive drum again at a third rotational speed faster than the first rotational speed, a plurality of times.

6. The image forming apparatus according to claim 5, wherein, in the case where the control unit executes the image forming operation, the control unit performs control in such a manner as to perform a switch operation of stopping the photosensitive drum in a state in which the photosensitive drum is driven at the third rotational speed, while the non-image forming operation to be executed after the image forming operation is executed, and driving the photosensitive drum again at the third rotational speed, a plurality of times.

7. The image forming apparatus according to claim 5, wherein the third rotational speed is the same as the second rotational speed.

8. The image forming apparatus according to claim 5, wherein the third rotational speed is a drive speed further faster than a fastest drive speed among drive speeds of a drive unit to be controlled at a time of the image forming operation.

9. The image forming apparatus according to claim 1, wherein, in the case where the control unit executes the image forming operation, the control unit performs control in such a manner as to perform a switch operation of stopping the photosensitive drum in a state in which the photosensitive drum is driven at the second rotational speed, while the non-image forming operation to be executed after the image forming operation is executed, and driving the photosensitive drum again at the second rotational speed, a plurality of times.

10. The image forming apparatus according to claim 1, wherein, in a case where the photosensitive drum is rotated, a surface speed of the charging member is faster than a surface speed of the photosensitive drum.

11. The image forming apparatus according to claim 1, further comprising a memory configured to record information regarding the image forming operation, wherein the information regarding the image forming operation is information regarding a number of continuously passed sheets of a recording material, and wherein the control unit performs control in such a manner as to switch a number of times of the switch operation in accordance with the number of continuously passed sheets in the image forming operation.

12. The image forming apparatus according to claim 1, wherein the control unit performs control in such a manner as to perform the switch operation up to a predetermined number of sheets since the image forming apparatus is new, and not to execute the switch operation after the predetermined number of sheets.

13. The image forming apparatus according to claim 1, wherein, in the switch operation, the control unit performs control in such a manner as to stop the photosensitive drum after driving the photosensitive drum, and to raise a speed of the photosensitive drum up to a steady state when driving the photosensitive drum again.

14. The image forming apparatus according to claim 1, wherein the toner is a one-component developer.

15. The image forming apparatus according to claim 1, further comprising a brush configured to have contact with a surface of the photosensitive drum that exists on an upstream of the charging portion, on a downstream of the transfer portion in a rotational direction of the photosensitive drum, wherein a density of the brush is 150 kF/inch$^2$ or more.

* * * * *